(12) United States Patent
Seino

(10) Patent No.: US 6,243,516 B1
(45) Date of Patent: Jun. 5, 2001

(54) MERGING OPTICAL WAVEGUIDES HAVING BRANCH ANGLE WITHIN A SPECIFIC RANGE

(75) Inventor: Minoru Seino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/246,965

(22) Filed: Feb. 9, 1999

(30) Foreign Application Priority Data

Feb. 23, 1998 (JP) ................................................ 10-040113

(51) Int. Cl.⁷ ...................................................... G02B 6/26
(52) U.S. Cl. ................... 385/47; 385/14; 385/45
(58) Field of Search .................. 385/39, 42, 45, 385/47, 50, 31, 27, 24, 15, 14, 43

(56) References Cited

U.S. PATENT DOCUMENTS

| | | | |
|---|---|---|---|
| 4,693,544 | 9/1987 | Yamasaki et al. | 350/96.16 |
| 5,088,105 | * 2/1992 | Scifres et al. | 372/92 |
| 5,097,479 | * 3/1992 | Opower | 372/95 |
| 5,799,120 | * 8/1998 | Kurata et al. | 385/45 |
| 5,825,951 | * 10/1998 | Kitamura | 385/45 |

FOREIGN PATENT DOCUMENTS

| | | |
|---|---|---|
| 0 726 475 A1 | 8/1996 | (EP) . |
| 0 778 478 A2 | 6/1997 | (EP) . |
| 63-221303 | 9/1988 | (JP) . |
| 5-2116 | 1/1993 | (JP) . |
| 5-232417 | 9/1993 | (JP) . |

OTHER PUBLICATIONS

European Search Report for European Application No. 99102751-7-2205- dated Jun. 5, 2000.

* cited by examiner

*Primary Examiner*—John D. Lee
*Assistant Examiner*—Michelle R. Connelly-Cushwa
(74) *Attorney, Agent, or Firm*—Staas & Halsey, LLP

(57) ABSTRACT

An optical waveguide device having a folded waveguide structure on a semiconductor substrate. The optical waveguide device includes first and second single mode optical waveguides formed on a semiconductor substrate. The first and second optical waveguides merge together into a merging optical waveguide. A reflector is positioned so that light travelling through the first optical waveguide into the merging optical waveguide is reflected by the reflector to travel through the second optical waveguide. A total reflection complementary angle for the light traveling through the first optical waveguide is $\theta_c$, and a branch angle $\theta_b$ of the first and second optical waveguides is less than or equal to $0.55\theta_c$.

58 Claims, 15 Drawing Sheets

MERGING OPTICAL WAVEGUIDES HAVING BRANCH ANGLE WITHIN A SPECIFIC RANGE

CROSS-REFERENCE TO RELATED APPLICATION

This application is based on, and claims priority to, Japanese application number 10-040113, filed on Feb. 23, 1998, in Japan, and which is incorporated herein by reference.

BACKGROUND OF THE INVENTION

1. Field of the Invention

The present invention relates to optical waveguides which merge together and have a branch angle within a specific range.

2. Description of the Related Art

Optical communication systems using fiber optical transmission lines are being used to transmit relatively large amounts of information. However, as users require larger amounts of information to be rapidly transmitted, and as more users are connected to the systems, a further increase in the transmission capacity of optical communication systems is required.

Optical waveguides are being used for this purpose. For example, optical waveguides are being used in optical external modulators to increase modulation rate, and in optical wave filters for wavelength-multiplex communications, to thereby increase transmission capacity of optical communication systems.

Optical waveguides are also used in various types of optical devices for taking measurements.

For such uses of optical waveguides, it is desirable to form optical waveguides in an integrated circuit (typically referred to as a "chip"). Unfortunately, conventional optical waveguides typically have required lengths which are so long that they prevent desired functions from being implemented within a single chip. For example, optical waveguides may have a required length as long as several centimeters. This makes it difficult to implement optical waveguides in a single chip, despite optical waveguide widths as narrow as several micrometers to several tens of micrometers.

In order to circumvent this problem, optical waveguides can be "folded" many times by using waveguide reflectors so as to implement a long length optical waveguide within the confines of a single chip.

For example, FIG. 1 is a diagram illustrating a conventional optical waveguide having a folded waveguide structure and formed on a single chip as a Mach-Zehnder modulator. (This device can be found, for example, in Institute of Electronics, Information, and Communication Engineers, Electronics Society Conference, C-151, 1995, which is incorporated herein by reference).

Referring now to FIG. 1, waveguides 100 make a U turn at one end of the chip via a folded waveguide portion 101. A reflection-type wave plate 102 is provided where light is reflected. Through a reflection, TE light changes to TM light, and TM light changes to TE light, thereby achieving a modulator which does not discriminate polarization.

In this example, the waveguides are folded in a geometrical manner (folding angle: 9 degrees). Such a configuration has problems in device performance. Namely, when such a simple configuration is employed, a length of a waveguide where light beams meet is rather short. Even when a reflection surface is formed by cutting saw or the like, a displacement as small as 10 μm may cause a serious deviation from the reflection geometry, thereby creating a large loss. In this example, a loss amounting to 2 dB may be suffered.

When the folding angle is decreased so as to be as small as several degrees, reflected light returns back to a waveguide where the original light came through. This is presents many problems.

In view of the above described problems, a configuration using folded waveguides has never been used in practice.

FIG. 2 is a diagram illustrating a conventional wavelength-filter-insertion type device. (This device can be found in Institute of Electronics, Information, and Communication Engineers, Electronics Society Conference, C-229, 1995, which is incorporated herein by reference.)

Referring now to FIG. 2, the device includes waveguides 110, a 1.55 μm port 112, a common port 114, a dielectric multi-layer filter 116 and a quartz-family optical waveguide 118 formed on a Si substrate 120. Waveguides 110 are arranged according to reflection geometry, and have a large reflection angle (10° to 40°) to avoid reflected light going back to where it came from. As a result, a position where filter 116 is placed has a tolerance level in the order of micro-meters. Unfortunately, such a small tolerance in device manufacturing precision results in a low yield.

Therefore, waveguide devices having folding configurations are known to exist. The problem is, however, that a process for creating these devices with sufficient precision is not known.

SUMMARY OF THE INVENTION

Accordingly, it is an object of the present invention to provide an optical waveguide device which has folded waveguides having a small loss and a high tolerance for precision, thereby enhancing performance that would otherwise be limited by the confines of a chip.

Additional objects and advantages of the invention will be set forth in part in the description which follows, and, in part, will be obvious from the description, or may be learned by practice of the invention.

The foregoing objects of the present invention are achieved by providing an apparatus which includes first and second single mode optical waveguides and a reflector. The first and second optical waveguides merge together into a merging optical waveguide. The reflector is positioned so that light travelling through the first optical waveguide into the merging optical waveguide is reflected by the reflector to travel through the second optical waveguide. A total reflection complementary angle for the light traveling through the first optical waveguide is $\theta_c$, and a branch angle $\theta_b$ of the first and second optical waveguides is less than or equal to $0.55\theta_c$. The first and second optical waveguides are formed on a substrate, and the total reflection complementary angle $\theta_c$ is based on a difference in refractive indexes between the first and second optical waveguides and the substrate.

Objects of the present invention are further achieved by providing an apparatus which includes first, second, third and fourth optical waveguides, and a reflector. The first and second optical waveguides merge together into a merging optical waveguide. The reflector is positioned so that light travelling through the first optical waveguide into the merging optical waveguide is reflected by the reflector to travel through the second optical waveguide. A branch angle $\theta_b$ of the first and second optical waveguides is less than or equal to $0.55\theta_c$, where $\theta_c$ is a total reflection complementary angle for the light traveling through the first optical waveguide. The third and fourth optical waveguides are on an opposite side of the reflector as the first and second optical waveguides. The reflector has transmission characteristics and is positioned so that light travelling through the third optical waveguide passes through the reflector and travels to one of the first and second optical waveguides, and so that light travelling through the fourth optical waveguide passes through the reflector and travels to the other of the first and second optical waveguides. The reflector is formed by either an optical waveguide filter, a half-mirror or a polarization mirror.

Objects of the present invention are also achieved by providing first and second optical waveguides which merge together into a merging optical waveguide, where the first and second optical waveguides and the merging optical waveguide are on a semiconductor substrate. A reflector is positioned so that light travels through the first optical waveguide into the merging optical waveguide, then through the merging optical waveguide to the reflector, and is then reflected by the reflector to travel through the second optical waveguide. The reflector is positioned beyond an intersection point of a center line of the first optical waveguide and a center line of the second optical waveguide. In addition, a branch angle $\theta_b$ of the first and second optical waveguides is less than or equal to $0.55\theta_c$.

Further, objects of the present invention are achieved by providing first and second optical waveguides which merge together into a merging optical waveguide, where the first and second optical waveguides and the merging optical waveguide are formed on a semiconductor substrate. A reflector is positioned so that light travels through the first optical waveguide and into the merging optical waveguide, then through the merging optical waveguide to the reflector, and is then reflected by the reflector to travel through the second optical waveguide. The length of the merging optical waveguide travelled by the light from the first optical waveguide to the reflector causes substantially all of the light travelling through the first optical waveguide and reflected by the reflector to travel to the second optical waveguide.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
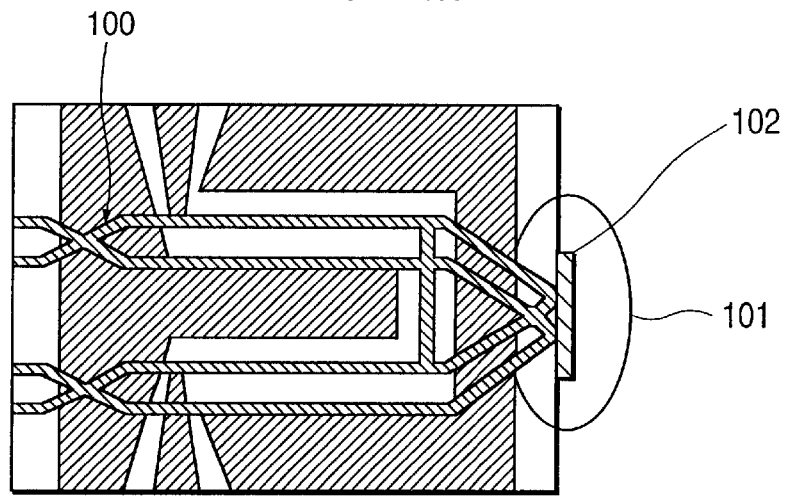
FIG. 1 is a diagram illustrating a conventional optical waveguide formed on a single chip as a Mach-Zehnder modulator.
Figure 2:
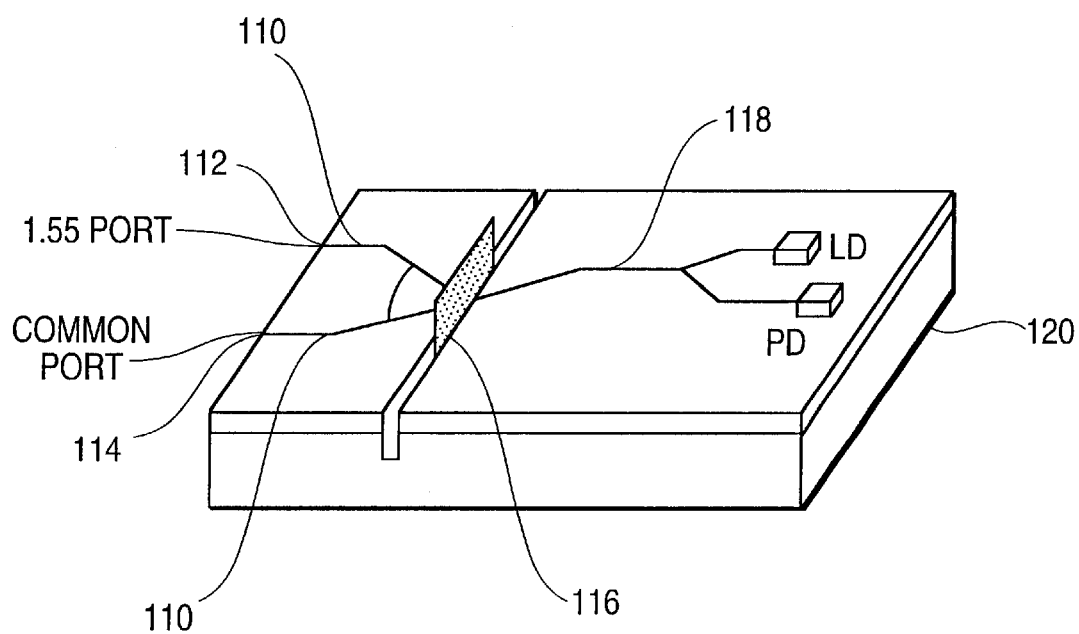
FIG. 2 is a diagram illustrating a conventional wavelength-filter-insertion type device.

Reference will now be made in detail to the present preferred embodiments of the present invention, examples of which are illustrated in the accompanying drawings, wherein like reference numerals refer to like elements throughout.

Figure 3:
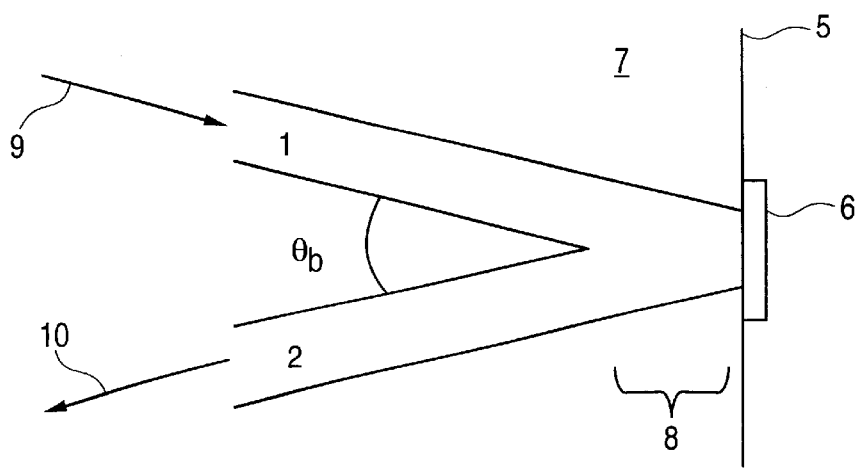
FIG. 3 is a drawing illustrating an optical waveguide device according to an embodiment of the present invention.

FIG. 3 is a diagram illustrating an optical waveguide device according to an embodiment of the present invention. Referring now to FIG. 3, single-mode optical waveguides 1 and 2 merge together into a merging waveguide 8. Optical waveguides 1 and 2 and merging waveguide 8 are formed on a substrate 7. A reflector 6 which is, for example, metal reflection film, wave filter, or other reflecting material or device, is formed at an end surface of substrate 7. A branch angle $\theta_b$ is between first and second optical waveguides 1 and 2. Incoming light 9 travels through optical waveguide 1 and is reflected by reflector 6. The reflected light travels through optical waveguide 2 to be output as outgoing light 10.

Figure 4:
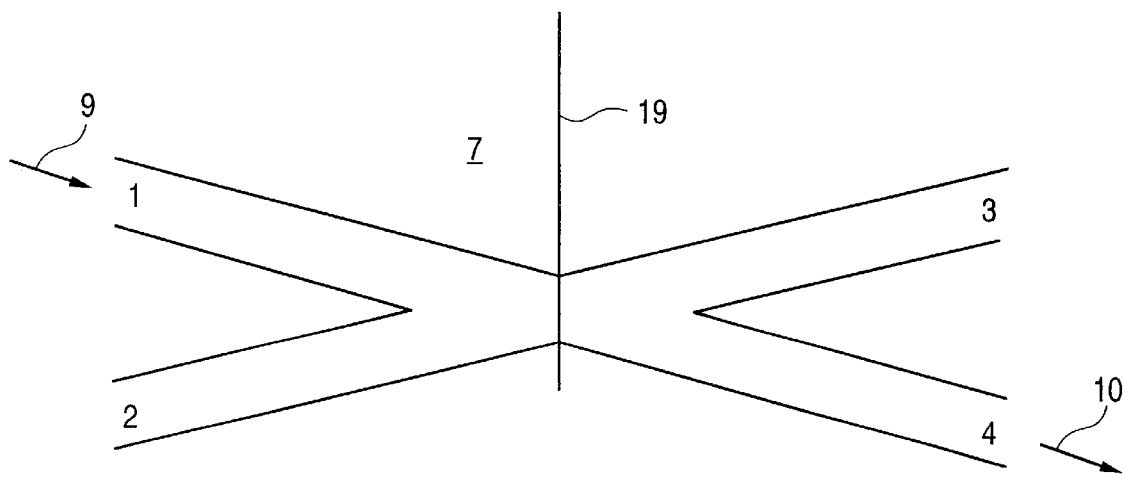
FIG. 4 is a diagram illustrating the operation of the optical waveguide device in FIG. 3, according to an embodiment of the present invention.

FIG. 4 is a diagram illustrating the operation of the optical waveguide device in FIG. 3, according to an embodiment of the present invention. More specifically, FIG. 4 shows a symmetric configuration created by considering the reflection surface of reflector 6 in FIG. 3 to be a surface of symmetry 19. Therefore, incoming light 9 travelling through optical waveguide 1 and wholly directed to optical waveguide 2 in FIG. 3 is equivalent to the fact that light coming through optical waveguide 1 is wholly directed to an optical waveguide 4 in FIG. 4.

Also, light that goes into an optical waveguide 3 in FIG. 4 actually goes into optical waveguide 1 as reflected light. Emission loss in FIG. 3 is also equated to emission loss in FIG. 4.

Figure 5:
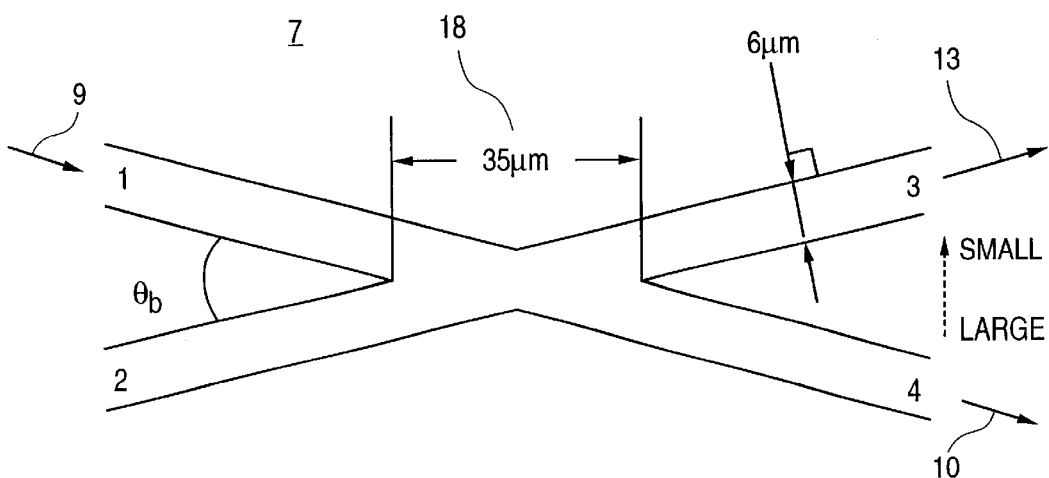
FIG. 5 is a diagram illustrating a principle of the optical waveguide device in FIG. 3, according to an embodiment of the present invention.

FIG. 5 is a diagram illustrating a principle of the optical waveguide device in FIG. 3, according to an embodiment of the present invention. Referring now to FIG. 5, when a branching angle $\theta_b$ is as large as several tens of degrees in a crossed-waveguide configuration having straight-line optical waveguides crossed with each other, incoming light travelling through optical waveguide 1 is mostly directed to optical waveguide 4 as outgoing light 10. Only a small portion of incoming light 9 is deviated into optical waveguide 3 as outgoing light 13.

The following is a specific example. When optical waveguides 1 through 4 have a width of 6 $\mu$m and the branch angle is 20°, an intersection portion 18 where merging optical waveguides 1 and 2 share the interior space is as short as 35 $\mu$m. With this length of intersection portion 18, light traveling through optical waveguides 1 and 2 experiences little diffraction, so that there is almost no light leaking into optical waveguide 3. This leaking light is equivalent to reflected light in FIG. 3.

When the folding configuration of FIG. 3 is created based on the configuration of FIG. 5, a positioning accuracy (e.g., 10 $\mu$m) for forming the end surface or placing reflector 6 (i.e., reflection film, wave filter, or the like) becomes twice as much (e.g., 20 $\mu$m) in the folding configuration. This error results in a displacement of optical waveguides 1 and 2.

Figure 6:
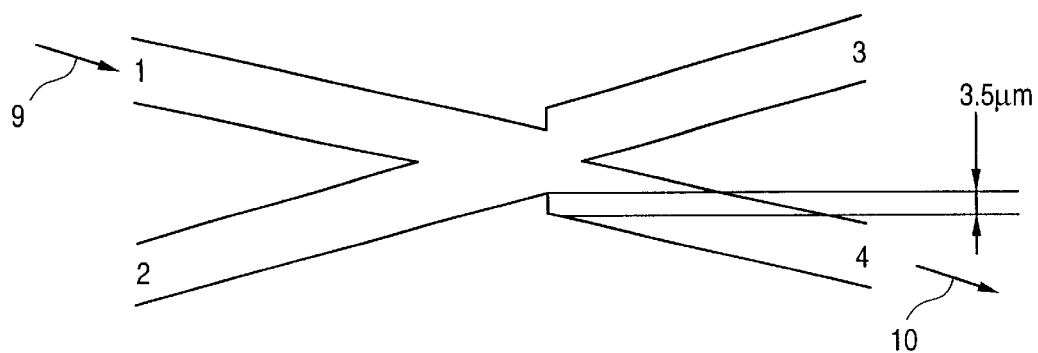
FIG. 6 is a diagram illustrating displacement between optical waveguides in an optical waveguide device, according to embodiments of the present invention.

For example, FIG. 6 is a diagram illustrating the displacement of optical waveguides 1 and 2, due to errors in positioning accuracy for forming the end surface or placing reflector 6. As indicated in FIG. 6, this error results in a displacement of optical waveguides 1 and 2 by, for example, 3.5 $\mu$m when a symmetric configuration is used for illustration.

If optical waveguides 1 and 3 are displaced by more than half the width as shown in FIG. 6, light traveling through optical waveguides 1 and 2 mostly ends up being wasted as emission loss (that is, light leaking through a displaced portion of the optical waveguides).

In order to place reflector 6, optical waveguides 1 and 2 need to be formed so as to have a width with a sufficient margin. In this case, the position of the reflection surface will have an even greater effect on the magnitude of the resulting error.

In the following, a case in which the branch angle $\theta_b$ between optical waveguides 1 and 2 and optical waveguides 3 and 4 is as small as several degrees will be considered.

When the optical waveguide width is 6 $\mu$m and the branching angle $\theta_b$ is 2°, the length of the intersection portion is, for example, 344 $\mu$m. In this case, a positioning error of 10 $\mu$m leads to a displacement of optical waveguides 1 and 2 which is only 0.3 $\mu$m. As a result, a loss due to a waveguide displacement is rather small. However, since the intersection portion is so long as 344 $\mu$m, light diffracts and spreads as passing through the intersection portion, resulting in a greater amount of light leaking from the waveguides. In some cases, more than 10% of the light intended to be directed optical waveguide 2 ends up returning back to optical waveguide 1 as reflected light.

In optical communications, it is generally believed that no problem arises if the returning reflection light is suppressed to be less than 0.03% (35 dB) of the total. When other factors such as isolators are taken into consideration, the returning reflection light may only need to be less than 3% (15 dB). In most cases, it would be unsatisfactory to have 10% of light coming back as returning reflection light. This is a significant reason why folded waveguides having a small branch angle or a long intersection portion have not been used in practice.

Therefore, in optical waveguide devices comprised of two optical waveguides formed on a substrate and merging together at a position where a reflector is situated, a trade off exists between the emission loss and the returning reflection light.

Figure 7:
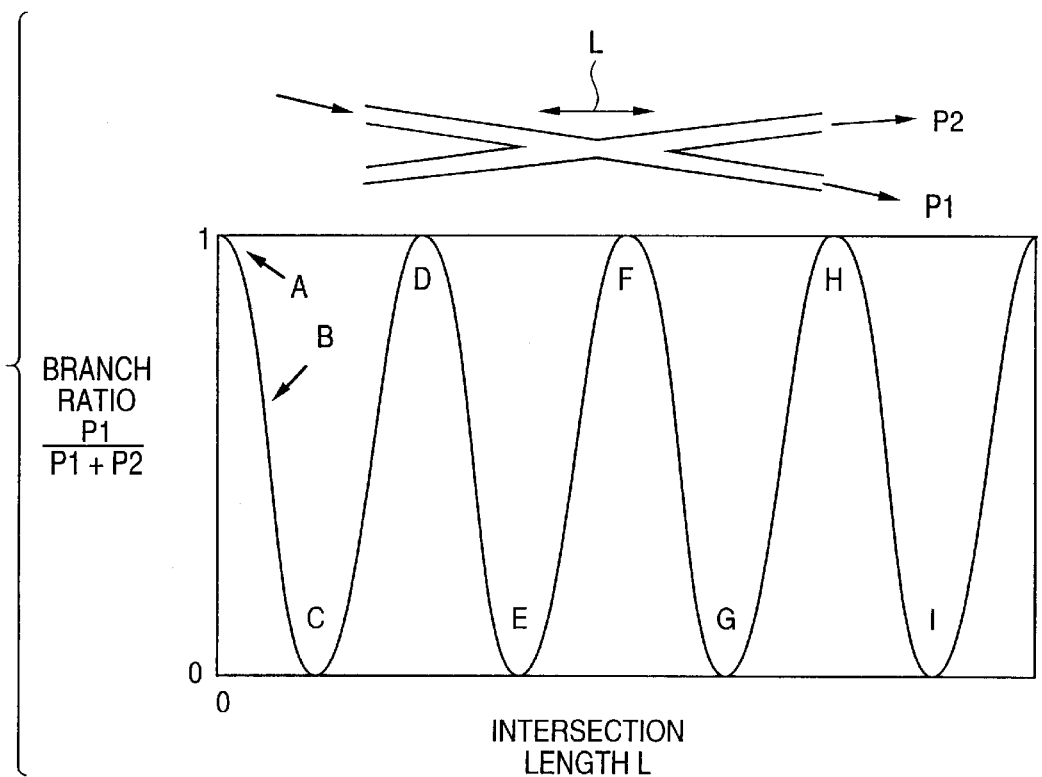
FIG. 7 is a diagram illustrating characteristics for explaining a principle of an optical waveguide device, according to an embodiment of the present invention.

FIG. 7 is a diagram illustrating characteristics for explaining a principle of an optical waveguide device, according to an embodiment of the present invention. More specifically, FIG. 7 shows how light in crossing optical waveguides travels into a straight-ahead optical waveguide (i.e., an optical waveguide situated along a straight extension of an optical waveguide through which light originally entered) when a length L of the intersection portion is changed as a parameter.

As shown in FIG. 7, a ratio of the light straying into the branch to the total output exhibits periodic changes. In what follows, the reason why this happens will be described.

Figure 8A:
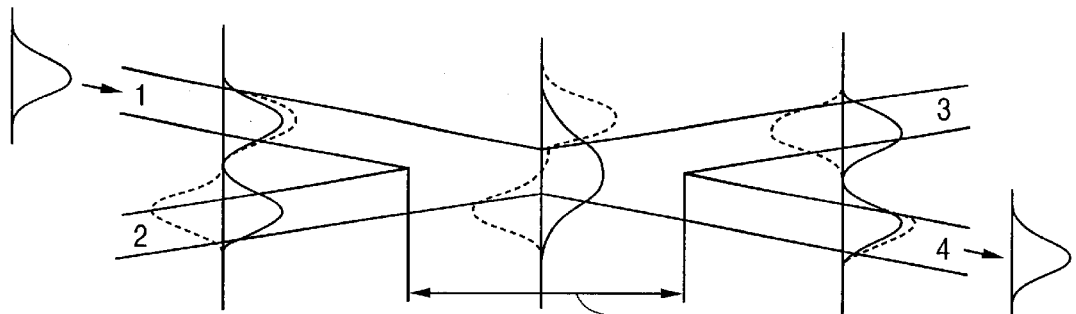
FIGS. 8(A) and 8(B) are diagrams illustrating the operation of an optical waveguide device, according to an embodiment of the present invention.
Figure 8B:
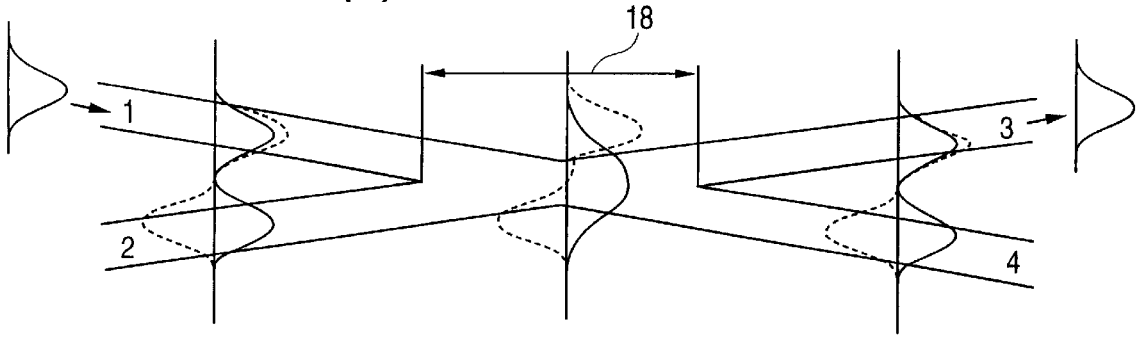

FIGS. 8(A) and 8(B) are diagrams illustrating the operation of an optical waveguide device, according to an embodiment of the present invention. Referring now to FIGS. 8(A) and 8(B), light entering optical waveguides 1 and 2 propagates as even-mode light (solid line) and odd-mode light (dotted line) of lower orders as optical waveguides 1 and 2 get closer to each other.

Since the shape of the optical waveguides changes as the light propagates further, the form of the modes and the propagation parameters also change continuously with regard to the light.

In general, even-mode light exchange power with other even-mode light, while odd-mode light exchange power with other odd-mode light. Generally, exchange of power does not occur between even-mode light and odd-mode light.

Light propagates as changes as described above take place. If statuses of the two modes are as shown in FIG. 8(A) at intersection portion 18, light proceeds to the straight-ahead optical waveguide 4. If the statuses of FIG. 8(B) are observed, light proceeds to the branch optical waveguide 3.

Outcomes are different between these two cases because the intersection length L is different between FIGS. 8(A) and 8(B). Namely, the intersection length L of FIG. 8(A) corresponds to one of A, D, F, and H in FIG. 7, and the intersection length L of FIG. 8(B) corresponds to one of C, E, G, and I in FIG. 7.

Further, statuses of FIGS. 8(A) and 8(B) corresponds to such statuses as having a phase displacement at times as much as π between an odd mode and an even mode in crossing waveguides.

If a reflection surface is placed at a center of intersection portion 18, incoming light propagates into the output optical waveguide 2 in the case of FIG. 8(A), while the incoming light returns to the input optical waveguide 1 in the case of FIG. 8(B).

In order to create proper folding waveguides, therefore, the condition of FIG. 8(A) should be satisfied. In the following, characteristics of the crossing angle and the intersection length will be described.

In the description of FIGS. 8(A) and 8(B), both the even mode and the odd mode are present at the center of the crossing optical waveguides. In practice, however, the input/output optical waveguides are single-mode waveguides, so that an odd mode does not exist at the center of the crossing optical waveguides since this portion has the same width as the input/output optical waveguides.

Nonexistence of a mathematical solution regarding this mode does not mean that light disappears. In such a condition, an emission mode status is observed, where power distribution, propagation parameters, and phase conditions are kept close to those of a waveguide mode.

When the branch angle is large or the intersection length is short, a waveguide width is enlarged before the emission mode spreads and changes its shape. Because of this, when the odd mode becomes excitable, the emission mode is again coupled with the odd mode, and goes on propagating. In this case, what is transformed during the emission mode is accounted for as losses.

In the case where the branch angle is small or the intersection length is long, the odd mode remains as the emission mode for a relatively long distance, during which the emission mode exhibits a significant change. Because of this, when the odd mode becomes excitable as the width of the waveguide becomes wider, the odd mode excited therein would have power distribution, propagation parameters, and phase conditions significantly different from those of the emission mode. The emission mode thus cannot couple with the odd mode, thereby creating a huge loss.

As a measure to counter this, a waveguide width of the crossing waveguides may be made wider than the original width.

In general, a waveguide width may be designed to be wider at any position within the intersection portion than the width of the input/output optical waveguides. This generally suffices to serve the above purpose.

It should be noted, however, that too wide a width may lead to excitation of higher modes, or may cause the emission mode to stay inside the optical waveguides longer than expected. This results in a degradation of a light-elimination ratio (i.e., an increase in the returning reflection light in the folding optical waveguides).

When the branch angle is large, an angle of a wavefront is also a problem.

Namely, the power distribution of FIGS. 8(A) and 8(B) may be attained, but the light proceeding to the branch optical waveguide has a wavefront which is at an angle with the branch optical waveguide, thereby creating a loss.

In the present invention, however, only the straight-ahead optical waveguide is used among the folding optical waveguides, so that the problem of the wavefront angle can be ignored.

In the description provided above, crossing waveguides represented as almost completely straight lines crossing each other were used for explanation. In principle, however, waveguides do not have to be in such a configuration.

Figure 9:
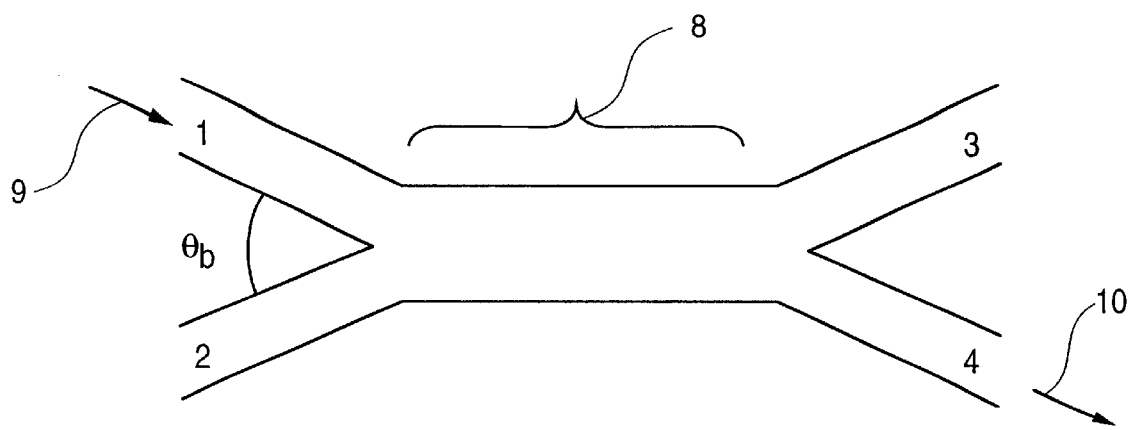
FIG. 9 is a diagram illustrating an optical waveguide device, according to an additional embodiment of the present invention.

For example, FIG. 9 is a diagram illustrating an optical waveguide device, according to an additional embodiment of the present invention. Referring now to FIG. 9, with this configuration, it is possible to couple incoming light with each of odd and even modes in a merging optical waveguide 8 with a little loss and without creating higher modes of light. This is achievable when the input/output optical waveguides 1 through 4 are formed so as to provide a sufficiently small branch angle (less than $0.55\theta_c$, as will be described later).

In merging optical waveguide 8 satisfying the conditions of FIG. 8(A), a careful selection of a width, a length, a shape, and a refractive index for a reflector provided at the center of merging optical waveguide 8 as shown in FIG. 3 allows an appropriate structure to be implemented independently of the branch angle such that this structure satisfies conditions for reducing the emission losses. Of course, the light going straight or going into the branch is affected at a portion close to the branch optical waveguide, and the above structure should be implemented by taking this effect into consideration.

It was learned that when the refractive index of the optical waveguides in the configuration of FIG. 9 is 0.2% relative to the substrate used for forming ordinary optical waveguides, an effect of suppressing generation of higher modes that cause losses begins to appear when the branch angle becomes less than 2°.

Further, this value was shown to be affected greatly by a difference in refractive indexes between the optical waveguides (core portion) and the substrate (clad portion) after examination of various conditions regarding wavelengths and waveguide widths.

As a result, it was learned that a total reflection complementary angle $\theta_c$, which is determined by a refractive index of the waveguides, can be used for standardizing the branch angle $\theta_b$.

As an example, a waveguide made of LiNbO with diffused Ti has a waveguide refractive index of 2.144 and a substrate refractive index of 2.14. In this case, the total reflection complementary angle $\theta_c$ is:

$$\theta_c \approx 3.5°$$

Using this angle, the condition that the branch angle $\theta_b$ is 2° is represented as:

$$2° \; 0.55\theta_c$$

Namely, the branch angle $\theta_b$ must satisfy:

$$\theta_b < 0.55\theta_c \quad (1)$$

in order to provide proper folding waveguides.

Moreover, if more appropriate folding optical waveguides are desired, the branch angle $\theta_b$ may be set smaller than 1°. That is, $$\theta_b < 0.29\theta_b \quad (2)$$

If the branch angle $\theta_b$ is too small, however, a long distance is necessary before the optical waveguides are sufficiently separated. Because of this, the branch angle $\theta_b$ is usually set within a range between 0.2° and 1°. That is, $$0.057\theta_c < \theta_b < 0.29\theta_c \quad (3)$$

It should be noted that the input/output optical waveguides do not have to be straight, but can be curved waveguides. In this case, a radius of the curve may be set to a large value, and a distance that is required before an interference between optical waveguides becomes sufficiently small may be measured by using straight lines as approximation. Based on this, the waveguides may be designed such that the measured angle falls within the above-proscribed range.

Figure 10:
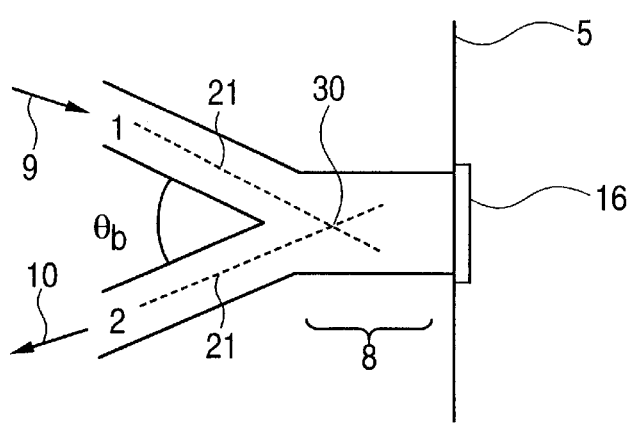
FIG. 10 is a diagram illustrating a reflection-type optical waveguide device based on the configuration of FIG. 9, according to an embodiment of the present invention.

FIG. 10 is a diagram illustrating a reflection-type optical waveguide device based on the configuration of FIG. 9, according to an embodiment of the present invention. Referring now to FIG. 10, a reflection film 16 for reflecting incoming light is provided at a position different from a crossing point 30 where imaginary extensions of center lines 21 of optical waveguide 1 and optical waveguide 2 meet with each other, showing a contrast with a case of FIG. 1 or FIG. 3 where straight waveguides simply cross each other.

Figure 11:
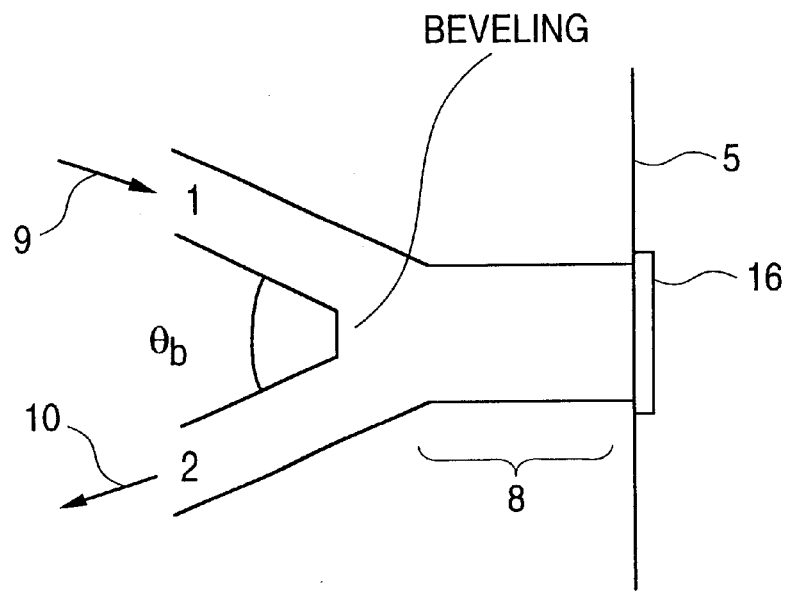
FIG. 11 is a diagram illustrating an optical waveguide device, according to an embodiment of the present invention.
Figure 12:
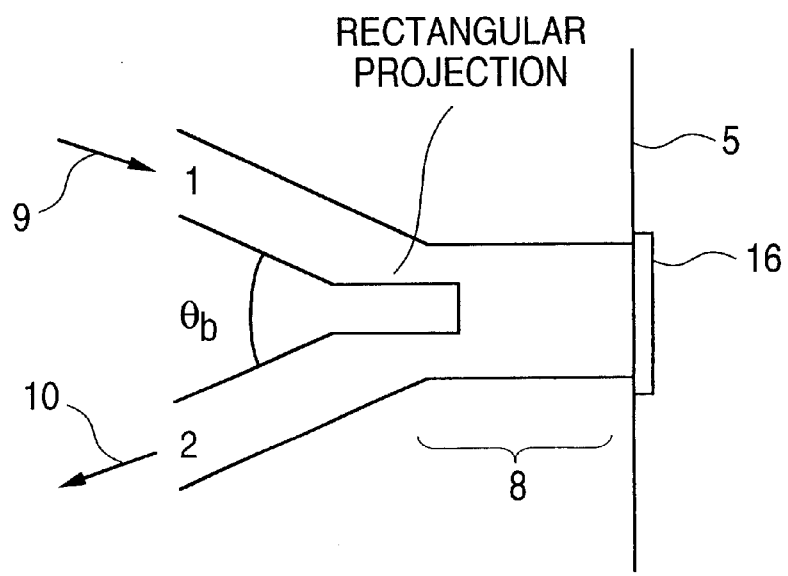
FIG. 12 is a diagram illustrating an optical waveguide device, according to an embodiment of the present invention.

FIGS. 11 and 12 are diagrams illustrating an optical waveguide device according to additional embodiments of the present invention. Referring now to FIGS. 11 and 12, a portion where folding optical waveguides start separating may be beveled or provided with a rectangular projection so as to provide a sufficient width that can be reliably manufactured by a process of a predetermined precision. This improves a yield of products by reducing product variations. Also, a position and a width of the beveled face or the rectangular projection may be adjusted so as to create higher modes of light, which interfere with each other in such a useful manner as to enhance performance of the folding waveguides.

Figure 13:
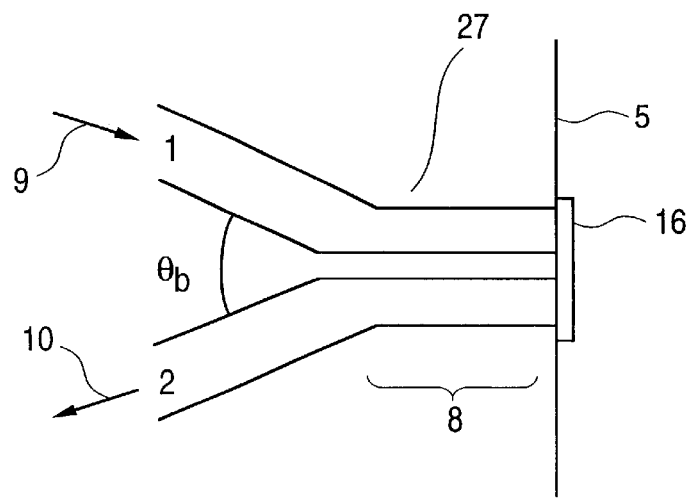
FIG. 13 is a diagram illustrating a directional coupler, according to an embodiment of the present invention.

FIG. 13 is a diagram illustrating a directional coupler 27 as an extension of the configuration of FIG. 12, according to an embodiment of the present invention. In this configuration, characteristics will largely depend on a width of the gap between the waveguides. In practice, an optimum length changes when the width of the gap changes, even within an error margin of the process. This presents a serious problem. Because of this characteristic, the configuration of FIG. 13 is inherently different from the configuration of FIG. 12.

Referring again to FIG. 7, the conditions shown as A, D, F, and H correspond to the status of FIG. 8(A), and the conditions C, E, G, and I correspond to the status of FIG. 8(B).

In FIG. 7, the condition A has a branch angle which is sufficiently large. In this condition, however, the intersection length L is too short as previously described, so that a slight error in forming the reflection surface results in generation of losses.

In order to avoid this problem, the intersection length L may be elongated so as to arrive at the condition B. In this condition, however, returning reflection light as well as a loss is generated.

The conditions D, F, and H, which achieve a phase difference multiple of $2\pi$ between the even mode and the odd mode, satisfy the appropriate folding conditions, and also offer local maximums with respect to a variation of the intersection length. In these conditions, therefore, an error as to where the reflection-surface is positioned has little influence.

As the intersection length is elongated from D to F, the branch angle of crossing waveguides becomes smaller. This reduces excessive coupling with higher modes, thereby serving to suppress losses and the returning reflection light. Wavelength dependency and/or polarization dependency may become more conspicuous, however, because propagation parameters of light have wavelength dependency and polarization dependency. In this manner, too long an intersection length also gives rise to problems.

Accordingly, when the folding waveguides are to be designed, factors as described above need to be taken into consideration in order to attain optimum conditions.

Further, when optical waveguides to be used are of a birefringence type, propagation parameters are different between TE-mode light and TM-mode light. Because of this, a characteristic curve as shown in FIG. 7 can be drawn differently between the TE-mode light and the TM-mode light. When such birefringence waveguides are used for making folding waveguides, the conditions D and F must be satisfied with respect to both the TE polarization and the TM polarization.

Figure 14:
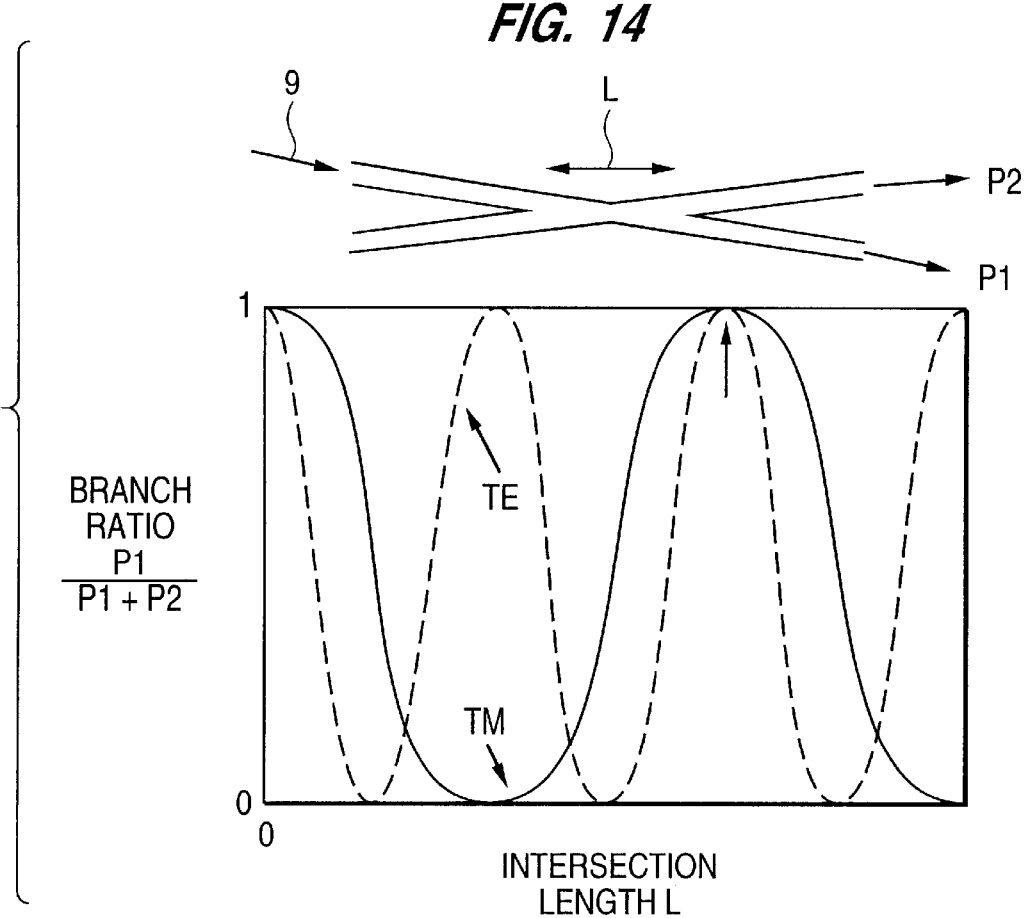
FIG. 14 is a diagram illustrating characteristics of an optical waveguide device, according to an embodiment of the present invention.

When waveguides are formed in a straightforward manner, it is difficult to match local maximums. However, a careful selection of a branch angle, a shape of the intersection portion (shape, width, squeezing of the intersection portion as shown in FIG. 11 and FIG. 12), conditions of the waveguide manufacturing process (Ti thickness, diffusion temperature, time, atmosphere), etc., can be made with respect to the waveguides so as to match the local maximums as shown in FIG. 14.

The above description has been given with respect to a reflector which is designed to reflect all light propagating through the waveguides. Different reflectors, however, can be used in the present invention.

Figure 15:
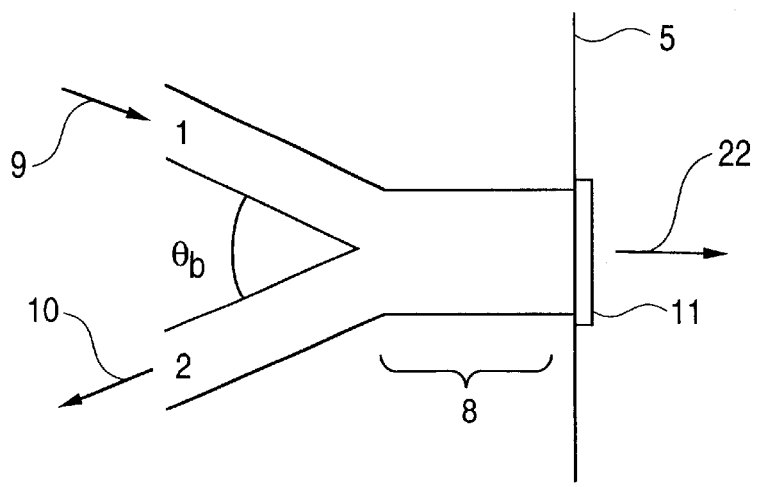
FIG. 15 is a diagram illustrating an optical waveguide device, according to a further embodiment of the present invention.

For example, FIG. 15 is a diagram illustrating an optical waveguide device according to a further embodiment of the present invention. Referring now to FIG. 15, a half-mirror 11 is used as a reflector and reflects some of incoming light 9, thereby providing a coupler function. Namely, incoming light 9 entering optical waveguide 1 is partly extracted as output light 22, and the remainder is directed to optical waveguide 2 as outgoing light 10.

Also, light may be input from where output light 22 is extracted so as to merge light beams. In this case, the light supplied from where output light 22 is extracted may proceed to both optical waveguides 1 and 2, which gives rise to a problem.

Figure 16:
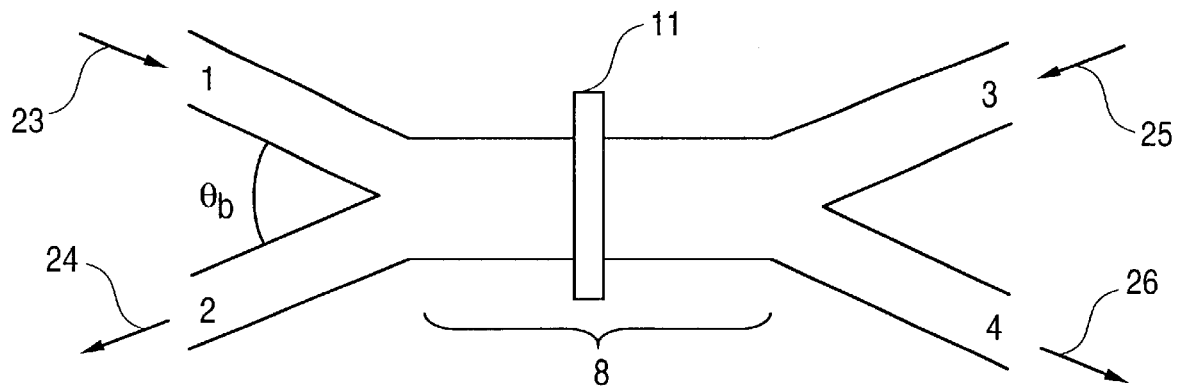
FIG. 16 is a diagram illustrating a variation of the optical waveguide device in FIG. 15, according to an embodiment of the present invention.

FIG. 16 is a diagram illustrating a variation of the optical waveguide device in FIG. 15, according to an embodiment of the present invention. Referring now to FIG. 16, half-mirror 11 is positioned at the center of merging optical waveguide 8, so that part of incoming light 23 through optical waveguide 1 is directed to optical waveguide 4 (but not to optical waveguide 3) as outgoing light 26, and the remainder is directed to optical waveguide 2 (but not to optical waveguide 1) as outgoing light 24.

When incoming light 25 enters optical waveguide 3 from the outside, the light is partly directed to optical waveguide 2, and is partly reflected to proceed to optical waveguide 4.

Figure 17:
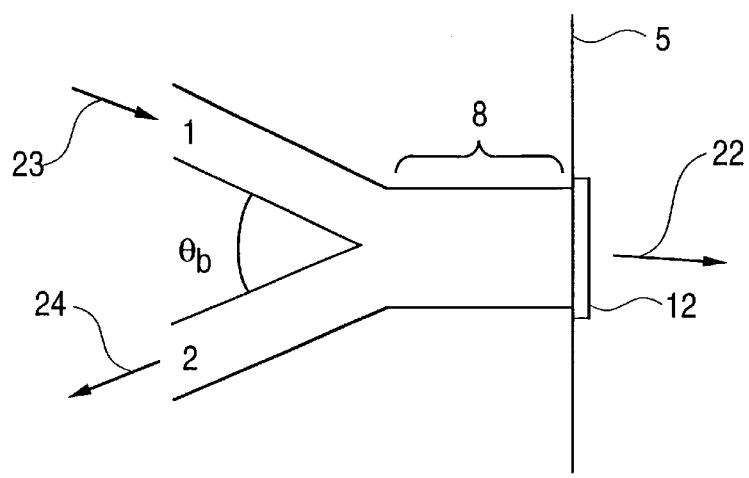
FIG. 17 is a diagram illustrating an optical waveguide device using a wave filter as a reflector, according to an embodiment of the present invention.

FIG. 17 is a diagram illustrating an optical waveguide device using a wave filter as a reflector, according to an embodiment of the present invention. Referring now to FIG. 17, a wave filter 12 allows light to pass therethrough as output light 22 only when the light has a wavelength corresponding to transparent characteristics of the filter, and the remainder of the light incoming through optical waveguide 1 is reflected and directed to optical waveguide 2 as outgoing light 24.

Figure 18:
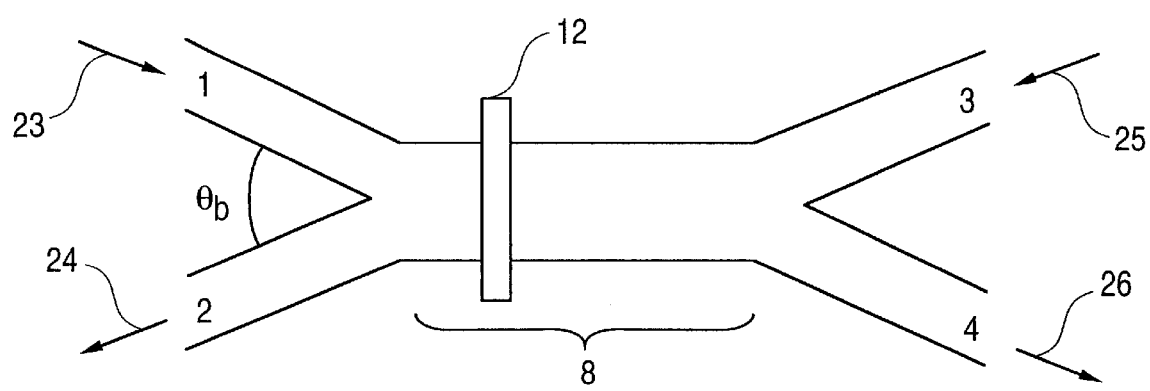
FIG. 18 is a diagram illustrating an optical waveguide device, according to an additional embodiment of the present invention.

FIG. 18 is a diagram illustrating an optical waveguide device according to an additional embodiment of the present invention. Referring now to FIG. 18, optical waveguides 3 and 4 and a portion of merging optical waveguide 8 are provided on the opposite side of wave filter 12 as optical waveguides 1 and 2. In this case, wave filter 12 allows light to pass therethrough and proceed to optical waveguide 4 only when the light has a wavelength corresponding to transparent characteristics of wave filter 12, and the remainder of the light incoming through the optical waveguide 1 is reflected and directed to optical waveguide 2. Further, light having a wavelength corresponding to the transparent characteristics of wave filter 12 may be input through optical waveguide 3, so that the light passes through wave filter 12 to proceed to optical waveguide 2. In this manner, this chip can provide a function of optical add/drop multiplexer (ADM).

In the optical waveguide device of FIG. 18, the position of wave filter 12 is generally not at the center of merging optical waveguide 8. This is because the folding conditions for light of a particular wavelength to be reflected are different from the conditions of passing light (peaks are different with respect to the intersection length L in FIG. 14 depending on wavelengths).

Further, use of a polarization separating reflection film makes it possible to control polarized light in terms of coupling and separation.

In this manner, various types of reflectors may be used in manufacturing various types devices, which are integrated, are compact, are suitable for mass production, incur only a small loss, have little returning light, and are capable of various functions.

Also, use of the folding optical waveguides makes it possible to create devices making up a modulator or an optical circuit such that these devices are longer in effect than a chip length, thereby providing enhanced functions.

The folding structure shown in FIG. 1 provides a Mach-Zehnder modulator which operates at a low power voltage and has no polarization dependency. This configuration, however, has a problem in that huge losses may be created when the reflector is actually implemented. The folding waveguides according to embodiments of the present invention can be applied to such a modulator, so that a device having a little loss and little returning light can be implemented at a high yield.

It is often desirable to arrange and connect together different devices on a substrate. These devices have a very fine width. When they are arranged in parallel, device integration with a higher density can be achieved. However, because of size constraints, it is difficult to accomplish this on a single chip, and there has been no working product of this kind.

Use of the folding waveguides of the present invention makes it possible to form such an integrated device on one chip.

Figure 19:
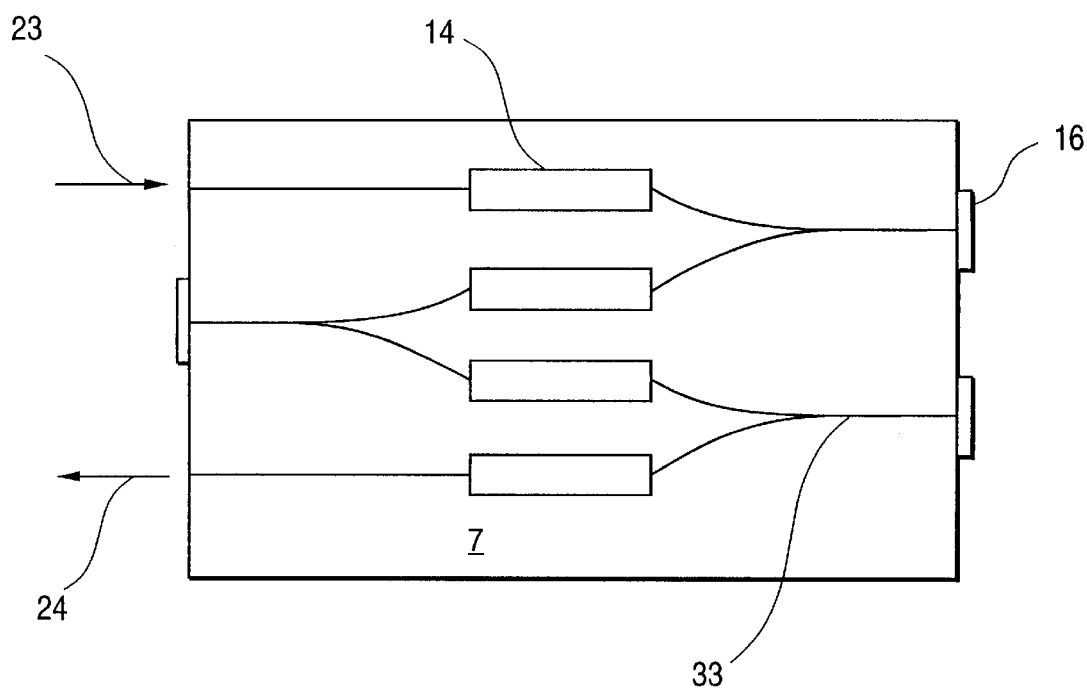
FIG. 19 is a diagram illustrating a plurality of optical devices on a single chip, according to an embodiment of the present invention.

For example, FIG. 19 is a diagram illustrating a plurality of optical devices on a single chip, according to an embodiment of the present invention. Referring now to FIG. 19, optical devices 14, such as optical modulators, each have one input and one output, and are arranged in a suitable manner on a single chip, according to an embodiment of the present invention. A folding waveguide structure 33 is used in this embodiment.

Figure 20:
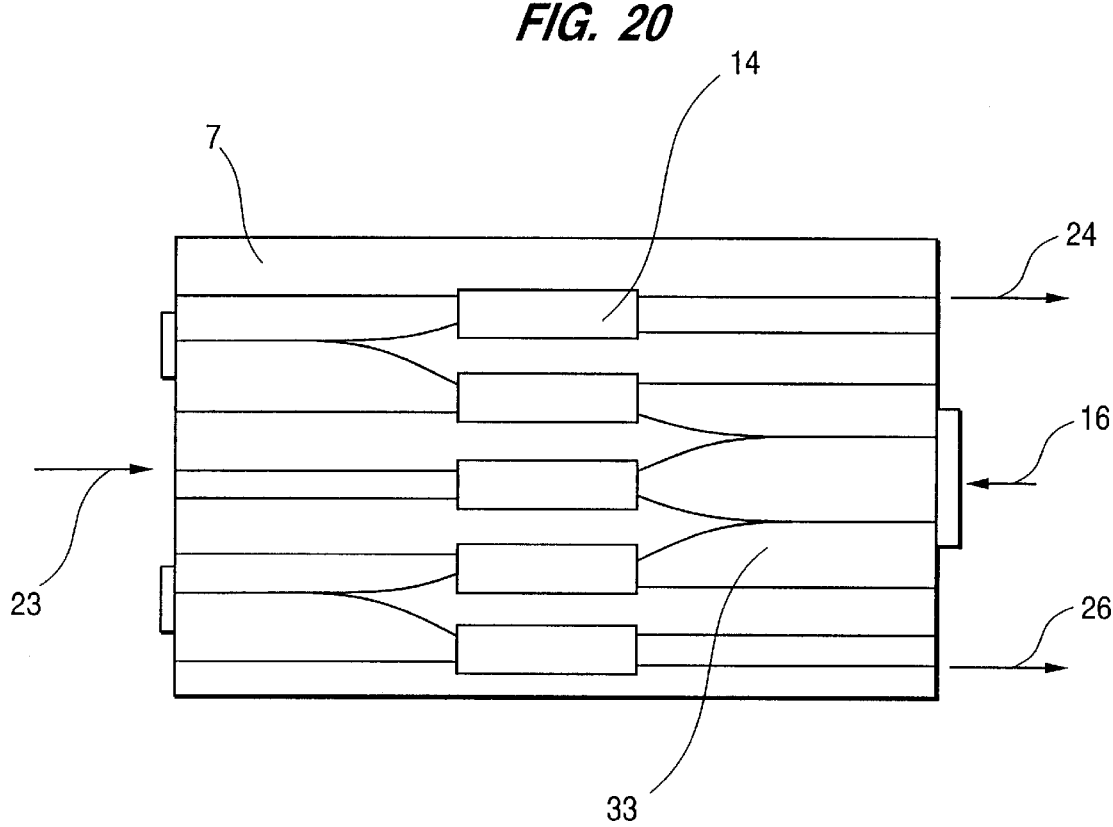
FIG. 20 is a diagram illustrating optical waveguide devices arranged on a single chip, according to a further embodiment of the present invention.

FIG. 20 is a diagram illustrating optical waveguide devices (e.g., optical switches, filters, etc.) arranged on a single chip, according to a further embodiment of the present invention. Referring now to FIG. 20, optical devices 14, each having two inputs and two outputs, are connected together via folding waveguide structures 33.

In this manner, the present invention facilitates integration of device elements, so that a smaller device can be manufactured at a higher yield and at a lower cost while providing the advantage of low losses, compared to when device elements are manufactured individually. Also, there is another advantage in that the device elements implemented on the chip are homogeneous, i.e., similar in characteristics.

When these device elements are driven based on electrical signals, it is easy to adjust phases, frequencies, and magnitude of these signals since the device elements are all implemented on the same chip.

According to the above embodiments of the present invention, a reflector is used to reflect light from one optical waveguide to another optical waveguide. The reflector may have different shapes. For example, it may have a surface formed in perpendicular to the travel direction of light. Alternatively, for example, the surface may be generally perpendicular to the travel direction of light along the depth of the substrate while having an arc shape when viewed from the top of the substrate. In this case, a sufficient space can be provided between an end of the merging waveguide and the reflector.

In detail, if a surface perpendicular to the travel direction of light along the depth of the substrate is an end surface of the optical waveguides, an optical reflection film can be provided on this surface to form a reflector. In this case, the optical reflection film may be implemented, for example, by using a dielectric multi-layer film or a metal film. Use of a metal film has a price advantage. When a metal film is used, silver, copper, or a copper alloy may be used to form the reflection film in order to achieve sufficiently high reflectivity. However, the reflector is not intended to be limited to any particular shape, or any particular material.

The reflection portion of the reflector should be manufactured with an extremely high precision in terms of an angle thereof or the like. Because of this, the end surface of the waveguides on which the reflector is provided is preferably formed at a different step from the step for forming the waveguide patterns.

In general, the reflection portion would typically be formed by a cutting saw (i.e., slicer or dicing saw).

When a dry-etching process is used for forming the waveguide end surface, it is desirable to etch the substrate over an area wider than the width of the waveguides after waveguides are patterned and produced.

The reflector may be made effectively by using a grating. Such a grating may be formed, for example, by changing the refractive index of the optical waveguides and a proximity thereof through heat diffusion, ion exchange, ion insertion, or ultraviolet-light illumination.

When a grating is formed, the refractive index can be changed deep into the substrate, thereby making it possible to provide a reflector having no polarization dependency. Other methods of forming a grating include partially etching the waveguides and changing the width of the waveguides. The same effect can be obtained by changing the refractive index of the clad.

An optical waveguide device can be conventionally formed with a width of several tens of micrometers. The length of the device, however, becomes as long as several centimeters. Use of the present invention allows various optical waveguide devices to be arranged in a folded manner, so that switches, modulators, filters, and the like are connected in tandem on one chip. This facilitates a density increase in a transverse direction of the waveguides, thereby miniaturizing a device while avoiding extension of the length of the chip. Also, a larger number of chips can be extracted from one wafer, resulting in a lower cost per chip.

If the folding structure of the present invention is not used, a plurality of chips need to be manufactured and connected together since there is a limit to a maximum chip size. When a plurality of chips are connected in this manner, various penalties will be incurred, such as increases in losses, degradation in reliability, a size increase, a cost increase, etc. The present invention provides a measure to overcome these problems.

Figure 21A:
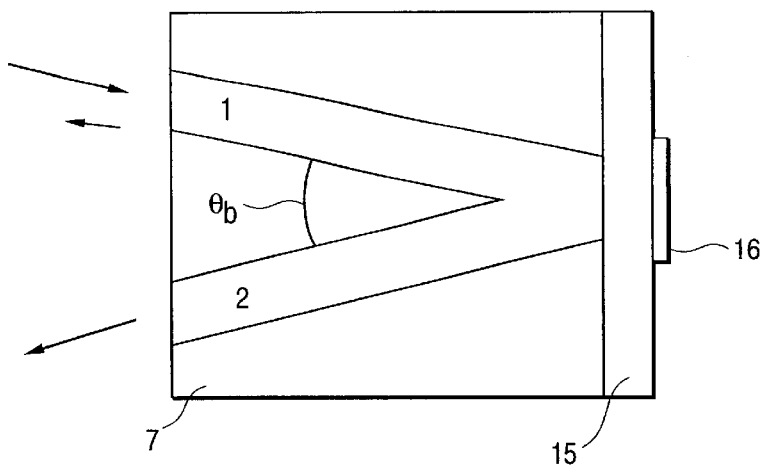
FIGS. 21(A) and 21(B) are diagrams illustrating a plan view and a side view, respectively, of an example of folding waveguides, according to an embodiment of the present invention.
Figure 21B:
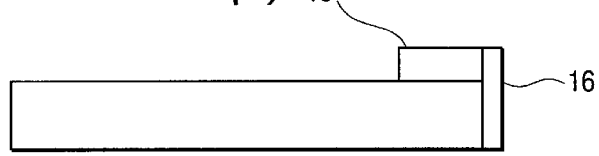

FIGS. 21(A) and 21(B) are diagrams illustrating a plan view and a side view, respectively, of an example of folding waveguides, according to an embodiment of the present invention. Referring now to FIGS. 21(A) and 21(B), in this example, substrate 7 is made of Si, on which glass waveguides are formed through a CVD method.

In this example, a thickness of an under-buffer layer is 60 $\mu$m, and a thickness of an over-buffer layer is 20 $\mu$m. Further, in this example, optical waveguides 1 and 2 have a core with a 6.5-$\mu$m width and a 6.5-$\mu$m thickness. A difference in the refractive index of the waveguides is varied by changing the doping amount of Ge and P. A guide plate 15 is fixed (typically by an adhesive) in order to help a cutting saw (i.e., slicer) to properly cut an end surface 5, and optical waveguides 1 and 2 crossing at a branch $\theta_b$ are cut at a center thereof. End surface 5 is then grounded to the extent necessary, and a metal film (made of, for example, Ag) is formed on end surface 5 via, for example, a vapor deposition method.

Figure 22A:
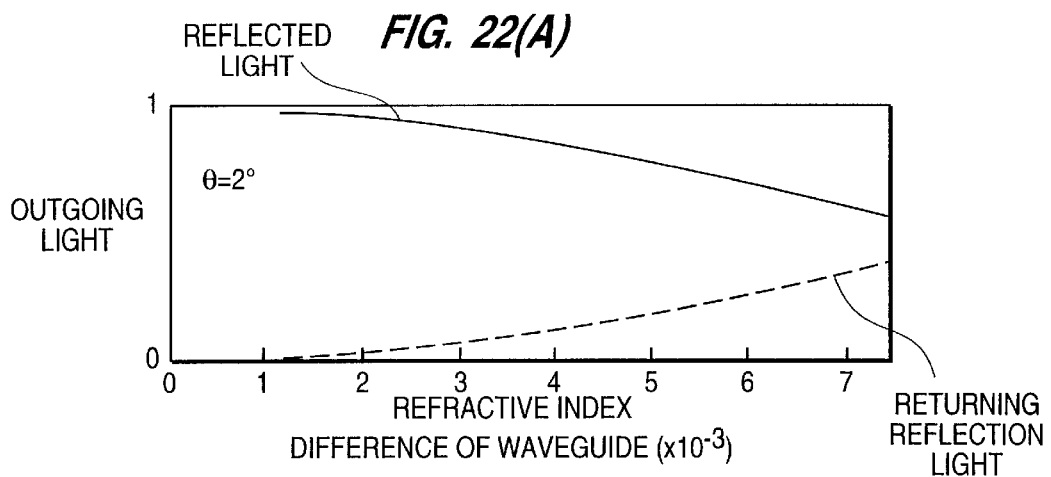
FIGS. 22(A) and 22(B) are diagrams illustrating examination results for an optical wavelength device, according to an embodiment of the present invention.
Figure 22B:
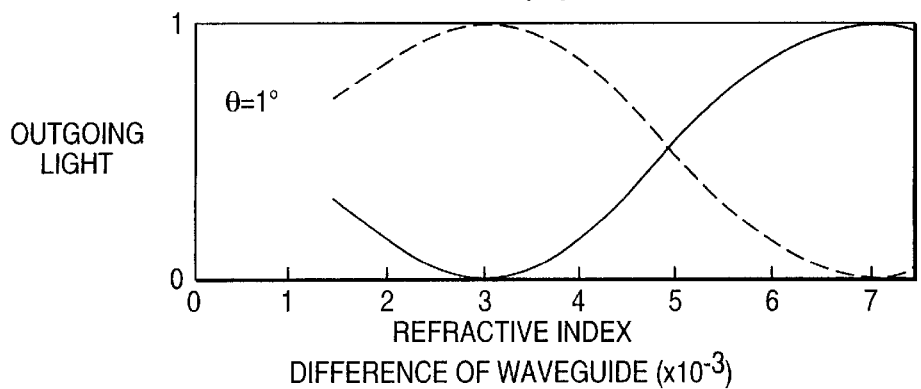

FIGS. 22(A) and 22(B) are diagrams illustrating optical waveguide characteristics of folding waveguides formed as described above when light having a wavelength of 1.3 $\mu$m was used for examination purposes, according to an embodiment of the present invention. Referring now to FIGS. 22(A) and 22(B), solid lines indicate folding light, and dashed lines represent returning reflection light.

As can be seen from FIGS. 22(A) and 22(B), when the branch angle $\theta_b$ was 2°, a change in the refractive-index difference of the optical waveguides (normally 0.004) only resulted in an increase of the returning reflection light, and a folding waveguide path was not established.

On the other hand, when the branch angle $\theta_b$ was 1°, a folding waveguide path was established when the refractive-index difference was 0.007.

Figure 23A:
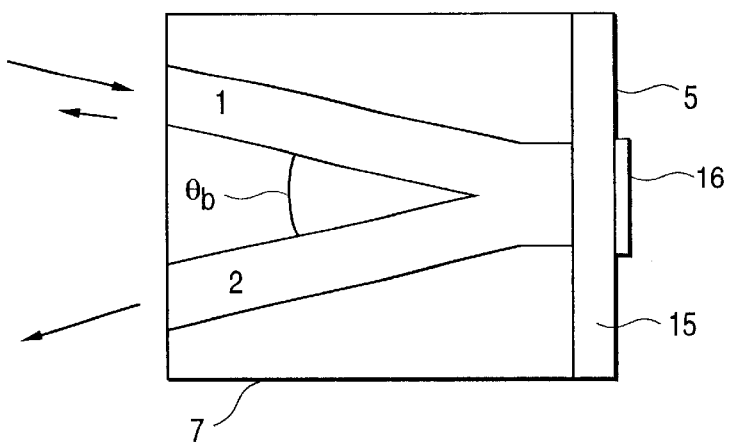
FIGS. 23(A) and 23(B) are diagrams illustrating a plan view and a side view, respectively, of an additional example of folding waveguides, according to an embodiment of the present invention.
Figure 23B:
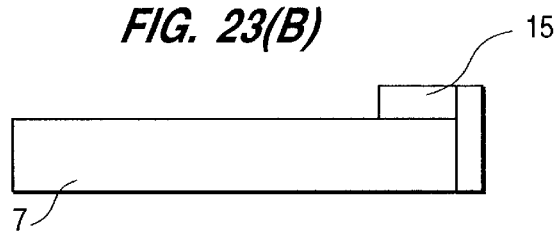

FIGS. 23(A) and 23(B) are diagrams illustrating a plan view and a side view, respectively, of an additional example of folding waveguides, according to an embodiment of the present invention. Referring now to FIGS. 23(A) and 23(B), substrate 7 is made, for example, of LiNbO with an x-cut. As an example, metal Ti is applied via heat diffusion, so that optical waveguides with a 5.5-$\mu$m width and y propagation are formed.

In this example, optical waveguides 1 and 2 have a different refractive index with respect to each of TE polarization and TM polarization. That is, they are birefringence optical waveguides.

In this example, the branch angle $\theta_b$ of optical waveguides 1 and 2 is 0.85°, and the merging waveguide has a wider width than do the optical waveguides 1 and 2. An SiO buffer layer is formed on the surface for the purpose of preventing dirt, and a guide plate 15 for helping a cutting saw (i.e., slicer) to cut end surface 15 is adhesively fixed. The waveguides crossing at the branch angle $\theta_b$ are cut at a center thereof. End surface 5 is then grounded to the extent necessary, and a metal film (Ag) is formed on the end surface via a vapor deposition method.

Figure 24:
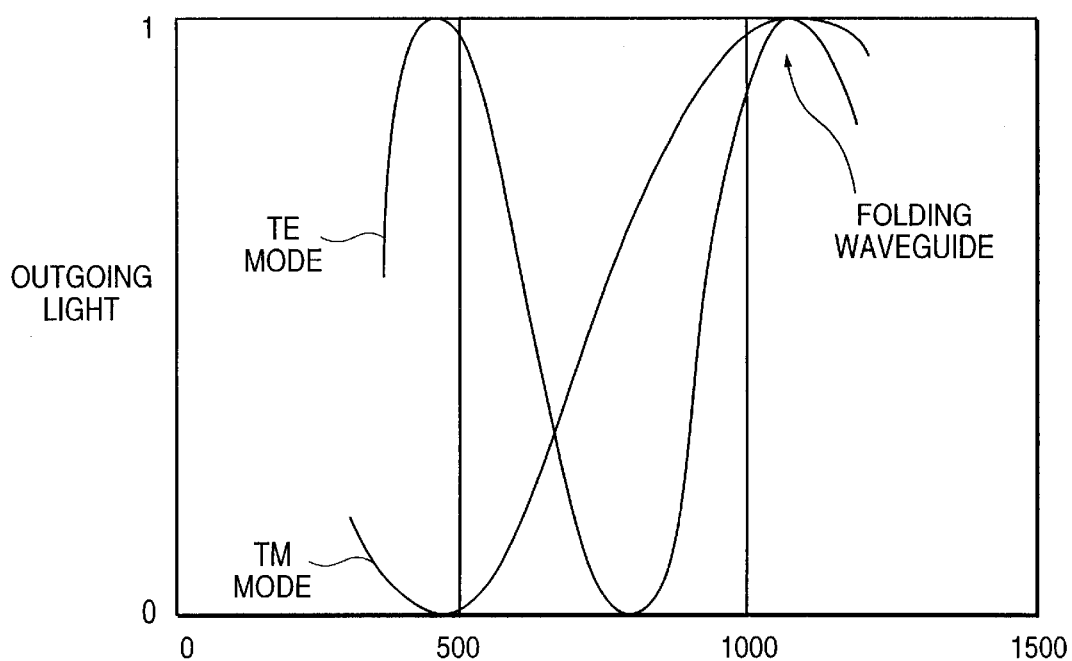
FIG. 24 is a diagram illustrating examination results for an optical waveguide device, according to an embodiment of the present invention.

FIG. 24 is a diagram illustrating examination results obtained when light having a wavelength of 1.55 $\mu$m was used in the folding waveguides described above. Referring now to FIG. 24, the folding waveguide path was established with respect to both the TE polarization and the TM polarization when the intersection length L is 1100 $\mu$m.

Figure 25A:
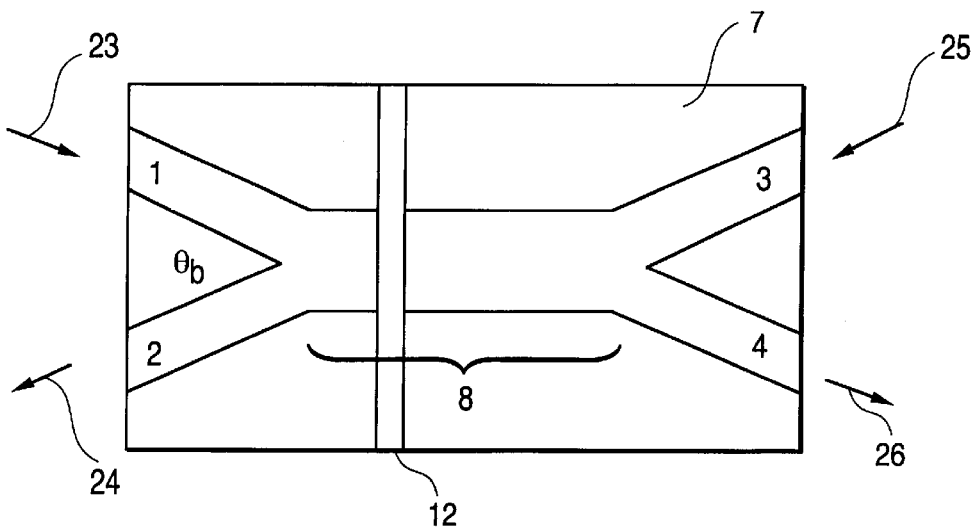
FIGS. 25(A) and 25(B) are diagrams illustrating a plan view and a side view, respectively, of an example of folding waveguides, according to an embodiment of the present invention.
Figure 25B:
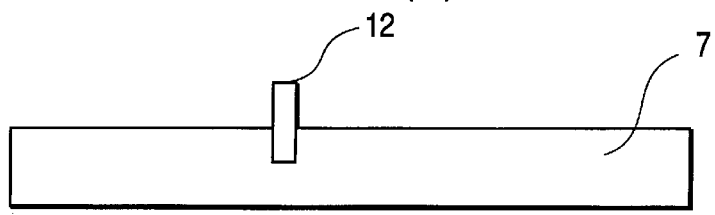

FIGS. 25(A) and 25(B) are diagrams illustrating a plan view and a side view, respectively, of a further example of folding waveguides, according to an embodiment of the present invention. Referring now to FIGS. 25(A) and 25(B), optical waveguides 1, 2, 3 and 4 are glass waveguides formed on an Si substrate 7 in the same manner as described above.

Merging waveguide 8 is designed to direct light passing through wave filter 12 exclusively to one of the output optical waveguides. Wave filter 12 is situated at such a position as to establish a folding waveguide path for light reflected by the filter.

As an example, in order to form wave filter 12, a groove with a width of 25 $\mu$m and a depth of 100 $\mu$m is created by a cutting saw, and, a dielectric multi-layer film having a thickness of, for example, 20 $\mu$m is inserted and adhesively fixed therein.

Light signals having respective wavelengths, i.e., 1.3 $\mu$m and 1.55 $\mu$m, are directed via optical waveguide 1, and only the light having the wavelength of 1.3 $\mu$m is reflected by wave filter 12. Since a folding waveguide path is established for the reflected light, the light having the wavelength of 1.3 $\mu$m is all directed to the output optical waveguide 2.

On the other hand, the light having the wavelength of 1.55 $\mu$m passes through wave filter 12, and proceeds to optical waveguide 4. If a light signal with a 1.55 $\mu$m wavelength enters optical waveguide 3, the light signal is directed to optical waveguide 2 to merge in the output light.

In this manner, a single chip can realize an optical ADM circuit.

Figure 26:
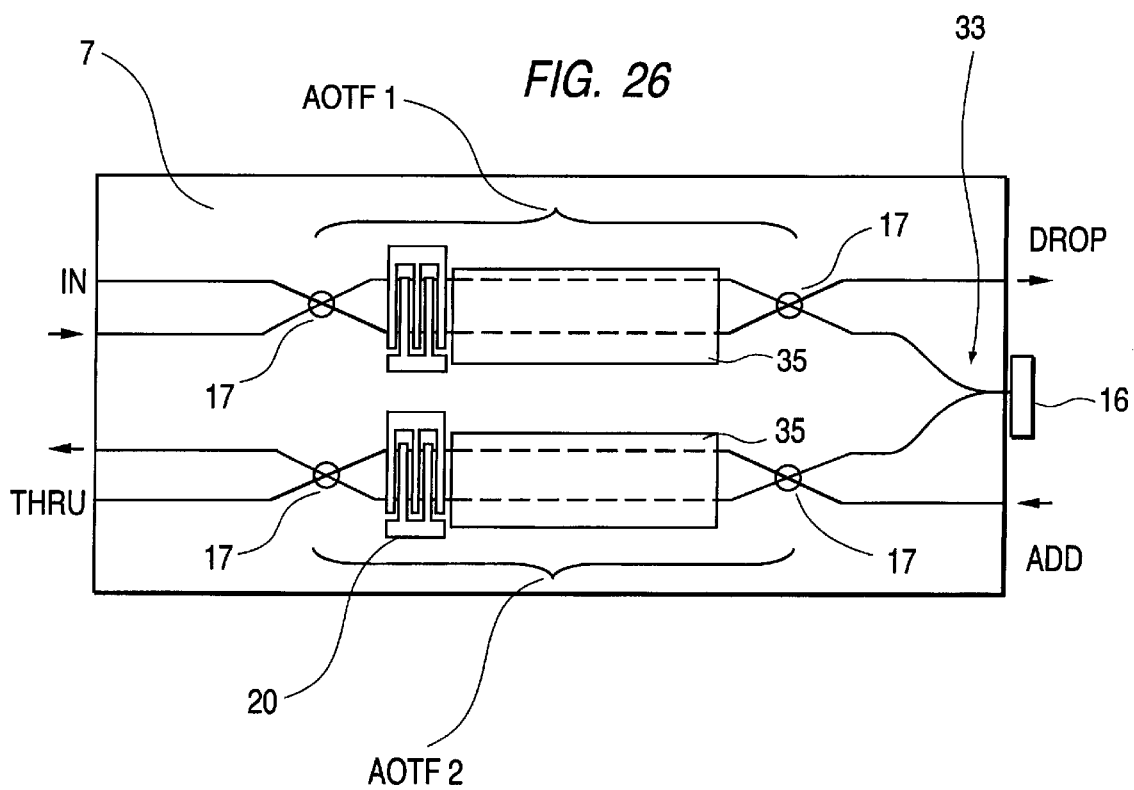
FIG. 26 is a diagram of a tunable wave filter, according to an embodiment of the present invention.

FIG. 26 is a plan view of an example of a tunable wave filter of a TE/TM-mode-conversion type (AOTF) using folding waveguides, according to an embodiment of the present invention.

Referring now to FIG. 26, a first AOTF 1 is connected to a second AOTF 2 via a folding waveguide 33. In this example, a metal film (Ti) is formed through heat diffusion on an LiNbO substrate having an x-cut, thereby creating optical waveguides. Optimization of a shape of the portion where two waveguides cross each other results in generation of PBS.

A PBS 17 separates TE polarization from TM polarization.

A surface acoustic wave (SAW) exited by an IDT 20 propagates through a SAW guide 35 of an attached thin film type. While propagating therethrough, light corresponding to a frequency of the SAW is only subjected to a TE/TM-mode conversion.

At the subsequent PBS 17, polarized light beams are coupled, and only the light which has experienced the TE/TM-mode conversion is directed to a Drop side.

Light which has not been subjected to the mode conversion by the SAW is directed to a folding waveguide structure 33, and is turned back by folding waveguide structure 33 without a TE/TM-polarization dependency. Then, the light proceeds to the second AOTF. The second AOTF removes Drop light which was not completely removed by the first AOTF, and extracts Thru light only.

This cascade connection can enhance a light-elimination ratio with respect to the Drop light, and, also, has an advantage in that the half-value width of the filter is narrowed. When light having a wavelength corresponding to SAW is input from an Add port, this light is merged with the Thru light.

The design can be so configured as to almost eliminate a possibility that the light supplied to the Add port propagates improperly to merge with the input light (In) or the Drop light.

Figure 27:
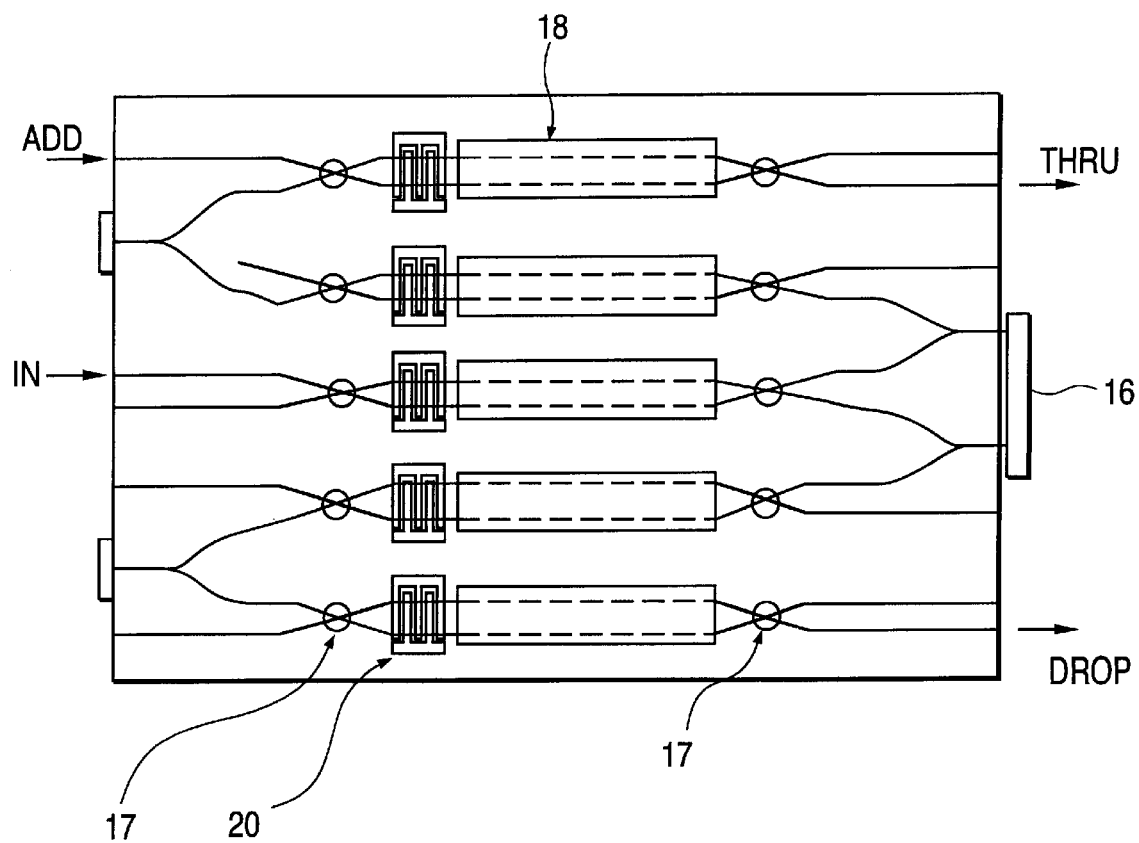
FIG. 27 is a diagram illustrating a configuration in which a plurality of tunable wave filters of a TE/TM-modeconversion type (AOTF) are arranged in a cascade connection, according to an embodiment of the present invention.

FIG. 27 is a diagram illustrating a configuration in which a larger number of tunable wave filters of a TE/TM-mode-conversion type (AOTF) are arranged in a cascade connection, according to an embodiment of the present invention. Referring now to FIG. 27, a three-step structure is provided for both the Drop light and the Thru light. This achieves an excellent half-value-filter-width characteristic as well as an excellent light-elimination ratio.

Such a structure as described above in which device elements are integrated in a cascade connection on one chip can suppress a product variation of each AOTF with regard to characteristics thereof. Also, such a structure allows high-frequency signals used for SAW to be supplied from a single power source, thereby avoiding phase displacements and/or frequency shifts between these signals.

Further, since a plurality of IDTs are connected in this configuration, signals supplied to the IDTs formed on the substrate may be set to the same frequency. This can partially cancel a Doppler shift of an optical signal which is generated by the SAW.

Namely, the Drop light passes through the AOTFs three times. The effect to eliminate the Doppler shift is observed between light propagating in the same direction as the SAW and light propagating in a different direction.

According to the embodiments of the present invention, folding waveguides are configured such that two single-mode input/output optical waveguides formed on a substrate are merged into a merging optical waveguide with a reflector being provided at an end thereof. A total reflection complementary angle based on a difference in refractive indexes between the waveguides and the substrate is $\theta_c$, and a branch angle $\theta_b$ of the input/output optical waveguides is set to no larger than $0.55\theta_c$. Further, the folding waveguides are configured by selecting a width and a branch angle of the input/output optical waveguides as well as a shape of the merging optical waveguide such that light incoming through a first one of the input/output optical waveguides is reflected and selectively directed to a second one of the input/output optical waveguides with only a minimum amount of light returning to the first one of the input/output optical waveguides. This configuration requires far less rigid precision in forming a reflection surface than a conventional reflection geometry. The present invention thus makes it possible to introduce folding of optical waveguides into a single chip while economic reasons prevented manufacturing of such a device in consideration of a large cost and a low yield.

The present invention further makes it possible to form an optical waveguide device as an integrated device whereas integration of the device was difficult because of its size extending several tens of millimeters in a longitudinal direction while extending only several tens of micrometers in a transverse direction.

Also, device characteristics such as a power voltage, a half-value width of a filter, a light-elimination ratio, etc., are significantly enhanced because the design of a device is freed from the chip-size restrictions.

Moreover, optical circuits, which used to be connected via fibers or the like after the circuits were manufactured as individual components, can now be formed as a single composite. This not only offers an advantage in terms of miniaturizing, a cost reduction, and suitability for mass production, but also provides a reliable one-chip device at a low cost.

An optical waveguide device, according to the embodiments of the present invention, can increase a device density in a direction transverse to the waveguides so as to allow a large number of waveguide devices to be integrated, and can provide reliable and sophisticated functions at a lower cost in a smaller device size.

As described above, the present invention relates to the total reflection complementary angle $\theta_c$ for the light traveling through the an optical waveguide.

Figure 28:
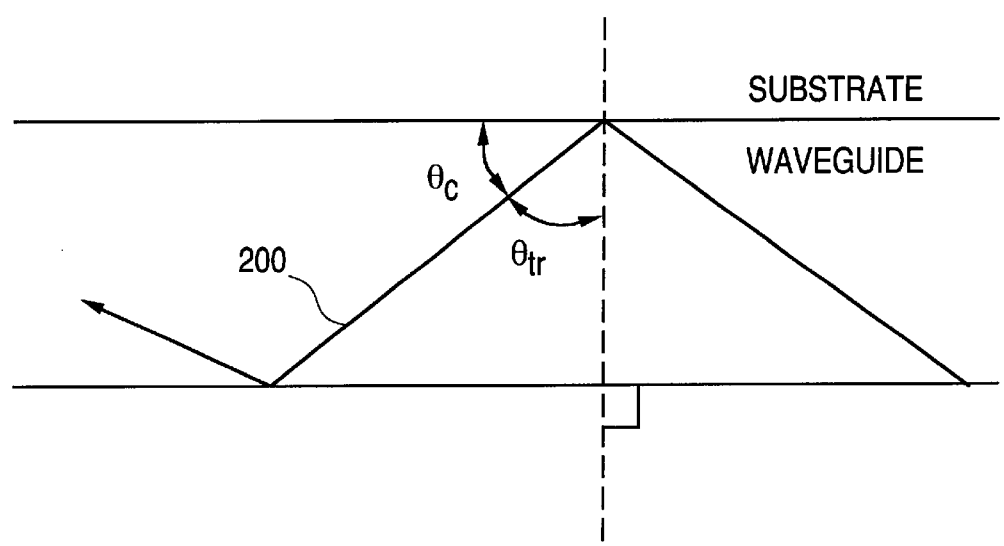
FIG. 28 is a diagram illustrating a total reflection complementary angle, according to an embodiment of the present invention.

FIG. 28 is a diagram illustrating the total reflection complementary angle $\theta_c$. In FIG. 28, $\theta_{tr}$ represents the total reflection angle of light 200 travelling through a waveguide formed on a substrate. $\theta_c$ is $90°-\theta_{tr}$, and is therefore referred to as the total reflection complementary angle. Generally, the total reflection angle $\theta_{tr}$ is based on the difference in refractive indices of the substrate ($n_s$) and the refractive index of the waveguide ($n_g$). More specifically, $\theta_{tr}=\sin^{-}(n_s/n_g)$. Therefore, the total reflection complementary angle $\theta_c$ is based on a difference in refractive indexes between the optical waveguides and the substrate. The concepts of a total reflection angle, and a total reflection complementary angle, are known in the art.

According to various embodiments of the present invention, as indicated above, a branch angle $\theta_b$ between optical waveguides which merge together is less than or equal to $0.55\theta_c$. Thus, $0.55\theta_c$ represents an upper limit for the branch angle $\theta_b$. A preferable range is for the branch angle $\theta_b$ to be less than or equal to $0.3\theta_c$. A more preferable range is for the branch angle $\theta_b$ to be in the range of $0.1°\leq\theta_b\leq1.5°$. An even more preferable range is for the branch angle $\theta_b$ to be in the range of $0.3°\leq\theta_b\leq0.8°$. Various other example values and ranges for the branch angle $\theta_b$ are described herein.

Various examples of materials for waveguides and substrates are described herein. However, there are many different waveguide and substrate materials which are applicable to the present invention, and the present invention is not intended to be limited to any specific materials.

Figure 29:
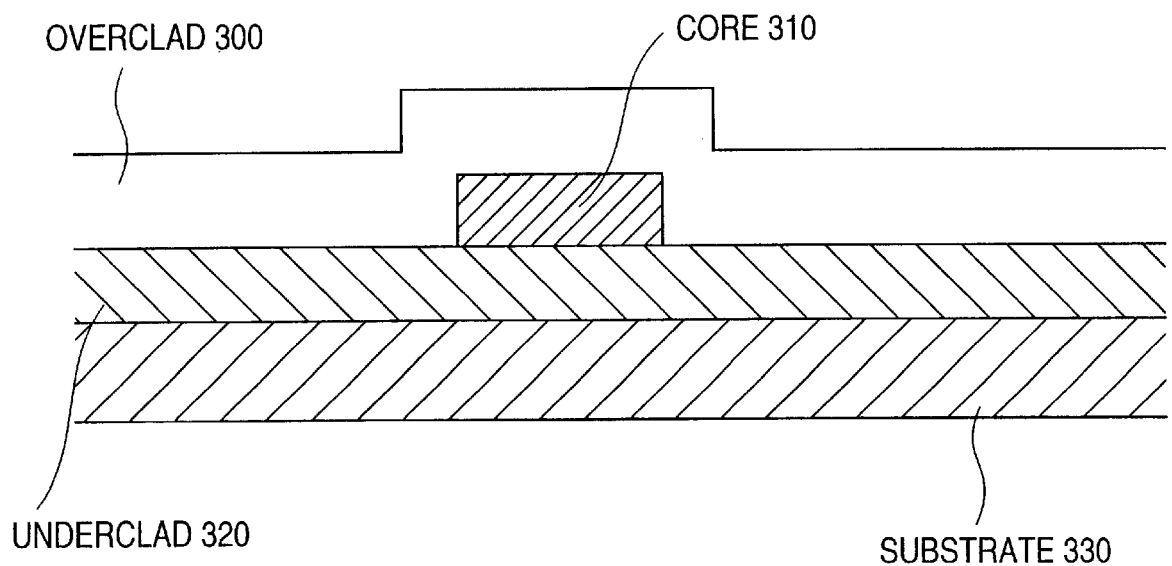
FIG. 29 is a diagram illustrating a waveguide/substrate structure applicable to embodiments of the present invention.
Figure 30:
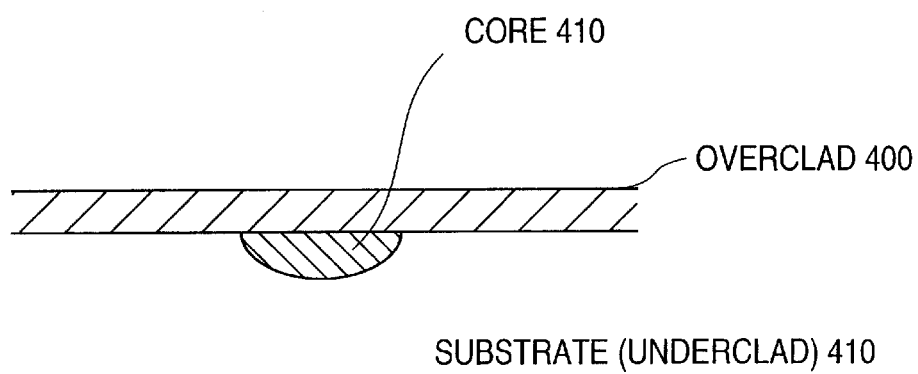
FIG. 30 is a diagram illustrating an additional waveguide/substrate structure applicable to embodiments of the present invention.

For example, FIGS. 29 and 30 are diagrams illustrating various types of waveguide and substrate structures using different types of materials, according to embodiments of the present invention.

More specifically, FIG. 29 is a diagram illustrating a waveguide/substrate structure applicable to embodiments of the present invention. Referring now to FIG. 29, the structure includes an overclad 300, a core 310, an underclad 320 and a substrate 330. Core 310 is formed, for example, of $SiO_2$ with dopants of P, Ti and Ge. Overclad 300 and underclad 320 are formed, for example, of $SiO_2$. Substrate 330 is formed, for example, of Si. The structure in FIG. 29 is typically referred to as a glass type waveguide with silicon substrate.

A plastic type waveguide is also applicable to embodiments of the present invention. A plastic type waveguide has a structure which is similar to that in FIG. 29, but different materials are used for the various layers.

FIG. 30 is a diagram illustrating an additional waveguide/substrate structure applicable to embodiments of the present invention. Referring now to FIG. 30, the structure includes an overclad 400, a core 410, and a substrate (underclad) 410. Overclad 400 is formed, for example, of $SiO_2$. Core 410 includes, for example, a Ti dopant. Substrate (underclad) 410 is formed, for example, of $LiNbO_3$. The structure in FIG. 30 is typically referred to as a $LiNbO_3$ waveguide.

FIGS. 29 and 30 are provided as examples of waveguide/substrate structures, and the present invention is not intended to be limited to these structures.

According to the above embodiments of the present invention, an apparatus includes first and second single mode optical waveguides and a reflector. The first and second optical waveguides merge together into a merging optical waveguide. The reflector is positioned so that light travelling through the first optical waveguide into the merging optical waveguide is reflected by the reflector to travel through the second optical waveguide. A total reflection complementary angle for the light traveling through the first optical waveguide is $\theta_c$, and a branch angle $\theta_b$ of the first and second optical waveguides is less than or equal to $0.55\theta_c$.

In addition, as indicated above, the width, shape and refractive-index distribution of the merging optical waveguide, and an incident angle of the first and second optical waveguides relative to the merging optical waveguide, can be constructed so that they together cause less than −15 dB of the light reflected by the reflector to be reflected back to the first optical waveguide. Moreover, as indicated above, when the first and second optical waveguides are birefringence type optical waveguides, the apparatus can be constructed so that less than −15 dB of the light reflected by the reflector is reflected back to the first optical waveguide for both TE polarized light and TM polarized light.

As indicated above, the apparatus can include third and fourth optical waveguides provided on an opposite side of the reflector as the first and second optical waveguides. The reflector is positioned and has transmission characteristics so that light travelling through the third optical waveguide passes through the reflector and travels to one of the first and second optical waveguides and so that light travelling through the fourth optical waveguide passes through the reflector and travels to the other of the first and second optical waveguides. The reflector can be formed, for example, by either an optical waveguide filter, a half-mirror or a polarization mirror.

Further, as indicated above, the width, shape and refractive-index distribution of the third and fourth optical waveguides, and a branching angle between the third and fourth optical waveguides, can be determined so that they together cause light travelling through the third optical waveguide to pass through the reflector and travel to one of the first and second optical waveguides and cause light travelling through the fourth optical waveguide to pass through the reflector and travel to the other of the first and second optical waveguides.

According to the above embodiments of the present invention, an apparatus includes first and second optical waveguides which merge together into a merging optical waveguide, where the first and second optical waveguides and the merging optical waveguide are on a semiconductor substrate. A reflector is positioned so that light travels through the first optical waveguide into the merging optical waveguide, then through the merging optical waveguide to the reflector, and is then reflected by the reflector to travel through the second optical waveguide. The reflector is positioned beyond an intersection point of a center line of the first optical waveguide and a center line of the second optical waveguide.

Further, according to the above embodiments of the present invention, an apparatus includes first and second optical waveguides which merge together into a merging optical waveguide, where the first and second optical waveguides and the merging optical waveguide are formed on a semiconductor substrate. A reflector is positioned so that light travels through the first optical waveguide and into the merging optical waveguide, then through the merging optical waveguide to the reflector, and is then reflected by the reflector to travel through the second optical waveguide. The length of the merging optical waveguide travelled by the light from the first optical waveguide to the reflector causes substantially all of the light travelling through the first optical waveguide and reflected by the reflector to travel to the second optical waveguide.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:
   first and second optical waveguides merging together into a merging optical waveguide; and
   a reflector positioned so that light travelling through the first optical waveguide into the merging optical waveguide is reflected by the reflector to travel through the second optical waveguide, wherein a total reflection complementary angle for the light traveling through the first optical waveguide is $\theta_c$, and a branch angle $\theta_b$ of the first and second optical waveguides is less than or equal to $0.55\theta_c$.

2. An apparatus as in claim 1, wherein the first and second optical waveguides, and the merging optical waveguide, are formed on a substrate.

3. An apparatus as in claim 2, wherein the first and second optical waveguides are single mode optical waveguides.

4. An apparatus as in claim 2, wherein the total reflection complementary angle $\theta_c$ is based on a difference in refractive indexes between the first and second optical waveguides and the substrate.

5. An apparatus as in claim 2, wherein the width, shape and refractive-index distribution of the merging optical waveguide, and an incident angle of the first and second optical waveguides relative to the merging optical waveguide, together cause less than −15 dB of the light reflected by the reflector to be reflected back to the first optical waveguide.

6. An apparatus as in claim 2, wherein the substrate is one of the group consisting of $LiNbO_3$ and Si.

7. An apparatus as in claim 1, wherein the reflector is positioned at an end of the merging optical waveguide.

8. An apparatus as in claim 1, wherein less than −15 dB of the light reflected by the reflector is reflected back to the first optical waveguide.

9. An apparatus as in claim 1, wherein a construction of the merging optical waveguide and an incident angle of the first and second optical waveguides relative to the merging optical waveguide together cause less than −15 dB of the light reflected by the reflector to be reflected back to the first optical waveguide.

10. An apparatus as in claim 1, wherein the width, shape and refractive-index distribution of the merging optical waveguide, and an incident angle of the first and second optical waveguides relative to the merging optical waveguide, together cause less than −15 dB of the light reflected by the reflector to be reflected back to the first optical waveguide.

11. An apparatus as in claim 1, wherein the first and second optical waveguides are birefringence type optical waveguides, and less than −15 dB of the light reflected by the reflector is reflected back to the first optical waveguide for both TE polarized light and TM polarized light.

12. An apparatus as in claim 1, wherein
the first and second optical waveguides are birefringence type optical waveguides, and
the width, shape and refractive-index distribution of the merging optical waveguide, and an incident angle of the first and second optical waveguides relative to the merging optical waveguide, together cause less than −15 dB of the light reflected by the reflector to be reflected back to the first optical waveguide for both TE polarized light and TM polarized light.

13. An apparatus as in claim 1, wherein the reflector allows light to pass partially therethrough.

14. An apparatus as in claim 13, wherein the reflector is formed by one of the group consisting of an optical waveguide filter, a half-mirror and a polarization mirror.

15. An apparatus as in claim 13, further comprising an optical waveguide which guides light passing through the reflector.

16. An apparatus as in claim 13, further comprising:
a third optical waveguide on an opposite side of the reflector as the first and second optical waveguides so that light travelling through the third optical waveguide passes through the reflector and travels to either the first or second optical waveguide.

17. An apparatus as in claim 13, further comprising:
third and fourth optical waveguides on an opposite side of the reflector as the first and second optical waveguides so that light travelling through the third optical waveguide passes through the reflector and travels to one of the first and second optical waveguides and light travelling through the fourth optical waveguide passes through the reflector and travels to the other of the first and second optical waveguides.

18. An apparatus as in claim 13, further comprising:
third and fourth optical waveguides on an opposite side of the reflector as the first and second optical waveguides, wherein the width, shape and refractive-index distribution of the third and fourth optical waveguides, and a branching angle between the third and fourth optical waveguides, together cause light travelling through the third optical waveguide to pass through the reflector and travel to one of the first and second optical waveguides and cause light travelling through the fourth optical waveguide to pass through the reflector and travel to the other of the first and second optical waveguides.

19. An apparatus as in claim 1, wherein the apparatus is a folded optical waveguide structure provided as an optical waveguide in one of the group consisting of an optical switch, an optical modulator and an optical filter.

20. An apparatus as in claim 1, wherein the branch angle $\theta_b$ is less than or equal to $0.3\theta_c$.

21. An apparatus as in claim 1, wherein the branch angle $\theta_b$ is in the range of $0.1° \leq \theta_b \leq 1.5°$.

22. An apparatus as in claim 1, wherein the branch angle $\theta_b$ is in the range of $0.3° \leq \theta_b \leq 0.8°$.

23. An apparatus as in claim 1, wherein the reflector is positioned beyond an intersection point of a center line of the first optical waveguide and a center line of the second optical waveguide.

24. An apparatus as in claim 1, wherein the length of the merging optical waveguide travelled by the light from the first optical waveguide causes substantially all of the light travelling through the first optical waveguide and reflected by the reflector to travel to the second optical waveguide.

25. An apparatus comprising:
first and second optical waveguides merging together into a merging optical waveguide, the first and second optical waveguides and the merging optical waveguide being formed on a substrate; and
a reflector positioned so that light travelling through the first optical waveguide and into the merging optical waveguide is reflected by the reflector to travel through the second optical waveguide, wherein a total reflection complementary angle based on a difference in refractive indexes between the first and second optical waveguides and the substrate is $\theta_c$, and a branch angle $\theta_b$ of the first and second optical waveguides is less than or equal to $0.55\theta_c$.

26. An apparatus as in claim 25, wherein the reflector is positioned at an end of the merging optical waveguide.

27. An apparatus as in claim 25, wherein the first and second optical waveguides are single mode optical waveguides.

28. An apparatus as in claim 25, wherein less than −15 dB of the light reflected by the reflector is reflected back to the first optical waveguide.

29. An apparatus as in claim 25, wherein a construction of the merging optical waveguide and an incident angle of the first and second optical waveguides relative to the merging optical waveguide together cause less than −15 dB of the light reflected by the reflector to be reflected back to the first optical waveguide.

30. An apparatus as in claim 25, wherein the first and second optical waveguides are birefringence type optical waveguides, and less than −15 dB of the light reflected by the reflector is reflected back to the first optical waveguide for both TE polarized light and TM polarized light.

31. An apparatus as in claim 25, wherein
the first and second optical waveguides are birefringence type optical waveguides, and
the width, shape and refractive-index distribution of the merging optical waveguide, and an incident angle of the first and second optical waveguides relative to the merging optical waveguide, together cause less than −15 dB of the light reflected by the reflector to be reflected back to the first optical waveguide for both TE polarized light and TM polarized light.

32. An apparatus as in claim 25, wherein the reflector allows light to pass partially therethrough.

33. An apparatus as in claim 32, further comprising:
a third optical waveguide on an opposite side of the reflector as the first and second optical waveguides so that light travelling through the third optical waveguide passes through the reflector and travels to either the first or second optical waveguide.

34. An apparatus as in claim 32, further comprising:
third and fourth optical waveguides on an opposite side of the reflector as the first and second optical waveguides so that light travelling through the third optical waveguide passes through the reflector and travels to one of the first and second optical waveguides and light travelling through the fourth optical waveguide passes through the reflector and travels to the other of the first and second optical waveguides.

35. An apparatus as in claim 25, wherein the reflector is one of the group consisting of an optical waveguide filter, a half-mirror and a polarization mirror.

36. An apparatus as in claim 25, wherein the apparatus is a folded optical waveguide structure provided as an optical waveguide in one of the group consisting of an optical switch, an optical modulator and an optical filter.

37. An apparatus as in claim 25, wherein the branch angle $\theta_b$ is less than or equal to $0.3\theta_c$.

38. An apparatus as in claim 25, wherein the branch angle $\theta_b$ in the range of $0.1° \leq \theta_b \leq 1.5°$.

39. An apparatus as in claim 25, wherein the branch angle $\theta_b$ is in the range of $0.3° \leq \theta_b \leq 0.8°$.

40. An apparatus as in claim 25, wherein the substrate is one of the group consisting of $LiNbO_3$ and Si.

41. An apparatus as in claim 25, wherein the reflector is positioned beyond an intersection point of a center line of the first optical waveguide and a center line of the second optical waveguide.

42. An apparatus as in claim 25, wherein the length of the merging optical waveguide travelled by the light from the first optical waveguide causes substantially all of the light travelling through the first optical waveguide and reflected by the reflector to travel to the second optical waveguide.

43. An apparatus comprising:
first and second optical waveguides merging together into a merging optical waveguide;
a reflector positioned so that light travelling through the first optical waveguide into the merging optical waveguide is reflected by the reflector to travel through the second optical waveguide, a branch angle $\theta_b$ of the first and second optical waveguides being less than or equal to $0.55\theta_c$, where $\theta_c$ is a total reflection complementary angle for the light traveling through the first optical waveguide; and
third and fourth optical waveguides on an opposite side of the reflector as the first and second optical waveguides, the reflector having transmission characteristics and positioned so that light travelling through the third optical waveguide passes through the reflector and travels to one of the first and second optical waveguides and light travelling through the fourth optical waveguide passes through the reflector and travels to the other of the first and second optical waveguides.

44. An apparatus as in claim 43, wherein the reflector is formed by one of the group consisting of an optical waveguide filter, a half-mirror and a polarization mirror.

45. An apparatus as in claim 43, wherein the first, second, third and fourth optical waveguides, and the merging optical waveguide, are formed on a substrate.

46. An apparatus as in claim 45, wherein the substrate is one of the group consisting of $LiNbO_3$ and Si.

47. An apparatus as in claim 43, wherein the first and second optical waveguides are single mode optical waveguides.

48. An apparatus as in claim 43, wherein the branch angle $\theta_b$ is less than or equal to $0.3\theta_c$.

49. An apparatus as in claim 43, wherein the branch angle $\theta_b$ is in the range of $0.1° \leq \theta_b 23\ 1.5°$.

50. An apparatus as in claim 43, wherein the branch angle $\theta_b$ is in the range $0.3° \leq \theta_b \leq 0.8°$.

51. An apparatus comprising:
a substrate;
first and second optical waveguides merging together into a merging optical waveguide, the first and second optical waveguides and the merging optical waveguide being on the substrate; and
a reflector positioned so that light travels through the first optical waveguide into the merging optical waveguide, then through the merging optical waveguide to the reflector, and is then reflected by the reflector to travel through the second optical waveguide, wherein the reflector is positioned beyond an intersection point of a center line of the first optical waveguide and a center line of the second optical waveguide, a total reflection complementary angle for the light traveling through the first optical waveguide is $\Theta_c$, and a branch angle $\Theta_b$ of the first and second optical waveguides is less than or equal to $0.55\Theta_c$.

52. An apparatus comprising:
a substrate;
first and second optical waveguides merging together into a merging optical waveguide, the first and second optical waveguides and the merging optical waveguide being on the substrate; and
a reflector positioned so that light travels through the first optical waveguide into the merging optical waveguide, then through the merging optical waveguide to the reflector, and is then reflected by the reflector to travel through the second optical waveguide, wherein the reflector is positioned beyond an intersection point of a center line of the first optical waveguide and a center line of the second optical waveguide, and the branch angle $\Theta_b$ is less than or equal to $0.3\Theta_c$, wherein $\Theta_c$ is a total reflection complementary angle for the light traveling through the first optical waveguide.

53. An apparatus comprising:
a substrate;
first and second optical waveguides merging together into a merging optical waveguide, the first and second optical waveguides and the merging optical waveguide being on the substrate; and
a reflector positioned so that light travels through the first optical waveguide into the merging optical waveguide, then through the merging optical waveguide to the reflector, and is then reflected by the reflector to travel through the second optical waveguide, wherein the reflector is positioned beyond an intersection point of a center line of the first optical waveguide and a center line of the second optical waveguide, and the branch angle $\Theta_b$ is in the range of $0.1° \leq \Theta_b \leq 1.5°$.

54. An apparatus comprising:
a substrate;
first and second optical waveguides merging together into a merging optical waveguide, the first and second optical waveguides and the merging optical waveguide being on the substrate; and
a reflector positioned so that light travels through the first optical waveguide into the merging optical waveguide, then through the merging optical waveguide to the reflector, and is then reflected by the reflector to travel through the second optical waveguide, wherein the reflector is positioned beyond an intersection point of a center line of the first optical waveguide and a center line of the second optical waveguide, and the branch angle $\Theta_b$ is in the range of $0.3° \leq \Theta_b \leq 0.8°$.

55. An apparatus comprising:

a substrate;

first and second optical waveguides merging together into a merging optical waveguide, the first and second optical waveguides and the merging optical waveguide being formed on the substrate; and a reflector positioned so that light travels through the first optical waveguide and into the merging optical waveguide, then through the merging optical waveguide to the reflector, and is then reflected by the reflector to travel through the second optical waveguide, wherein the length of the merging optical waveguide travelled by the light from the first optical waveguide to the reflector causes substantially all of the light travelling through the first optical waveguide and reflected by the reflector to travel to the second optical waveguide, a total reflection complementary angle for the light traveling through the first optical waveguide is $\Theta_c$, and a branch angle $\Theta_b$ of the first and second optical waveguides is less than or equal to $0.55\Theta_c$.

56. An apparatus comprising:

a substrate;

first and second optical waveguides merging together into a merging optical waveguide, the first and second optical waveguides and the merging optical waveguide being formed on the substrate; and a reflector positioned so that light travels through the first optical waveguide and into the merging optical waveguide, then through the merging optical waveguide to the reflector, and is then reflected by the reflector to travel through the second optical waveguide, wherein the length of the merging optical waveguide travelled by the light from the first optical waveguide to the reflector causes substantially all of the light travelling through the first optical waveguide and reflected by the reflector to travel to the second optical waveguide, and the branch angle $\Theta_b$ is less than or equal to $0.3\Theta_c$, wherein $\Theta_c$ is a total reflection complementary angle for light traveling through the first optical waveguide.

57. An apparatus comprising:

a substrate;

first and second optical waveguides merging together into a merging optical waveguide, the first and second optical waveguides and the merging optical waveguide being formed on the substrate; and a reflector positioned so that light travels through the first optical waveguide and into the merging optical waveguide, then through the merging optical waveguide to the reflector, and is then reflected by the reflector to travel through the second optical waveguide, wherein the length of the merging optical waveguide travelled by the light from the first optical waveguide to the reflector causes substantially all of the light travelling through the first optical waveguide and reflected by the reflector to travel to the second optical waveguide, and the branch angle $\Theta_b$ is in the range of $0.1° \leq \Theta_b \leq 1.5°$.

58. An apparatus comprising:

a substrate;

first and second optical waveguides merging together into a merging optical waveguide, the first and second optical waveguides and the merging optical waveguide being formed on the substrate; and a reflector positioned so that light travels through the first optical waveguide and into the merging optical waveguide, then through the merging optical waveguide to the reflector, and is then reflected by the reflector to travel through the second optical waveguide, wherein the length of the merging optical waveguide travelled by the light from the first optical waveguide to the reflector causes substantially all of the light travelling through the first optical waveguide and reflected by the reflector to travel to the second optical waveguide, and the branch angle $\Theta_b$ is in the range of $0.3° \leq \Theta_b \leq 0.8°$.

* * * * *